US005539440A

United States Patent [19]

Higuchi et al.

[11] Patent Number: 5,539,440

[45] Date of Patent: Jul. 23, 1996

[54] IMAGE FORMING APPARATUS HAVING COLORANT HOLDING REGIONS AND A COLORANT REPELLING REGION

[75] Inventors: Kazuhiko Higuchi, Kawasaki; Yuzo Koike, Yokohama; Hideyuki Nakao, Kawasaki; Shuzo Hirahara; Tutomu Saito, both of Yokohama; Koichi Ishii, Kawasaki, all of Japan

[73] Assignee: Kabushiki Kaisha Toshiba, Kawasaki, Japan

[21] Appl. No.: 39,769

[22] Filed: Mar. 30, 1993

[30] Foreign Application Priority Data

Mar. 30, 1992 [JP] Japan .................................... 4-072025

[51] Int. Cl.[6] .................................................... G01D 15/06

[52] U.S. Cl. .......................... 347/112; 347/153; 347/154; 347/155; 347/171; 346/135.1

[58] Field of Search ............................ 346/76 PH, 153.1, 346/159, 151, 160, 76 L, 135.1; 347/112, 153, 154, 155, 171

[56] References Cited

U.S. PATENT DOCUMENTS

| | | | |
|---|---|---|---|
| 3,409,902 | 11/1968 | Merryman | 346/76 PH |
| 3,654,864 | 4/1972 | Ovshinsky | 346/76 L X |
| 4,514,744 | 4/1985 | Saitoh et al. | 346/153.1 |
| 4,532,865 | 8/1985 | Yoshino | 346/76 PH X |
| 4,603,986 | 8/1986 | Simpson | 346/76 PH X |
| 4,608,577 | 8/1986 | Hori | 346/76 PH X |
| 4,746,939 | 5/1988 | Kikuchi et al. | 346/153.1 |
| 4,764,776 | 8/1988 | Mugrauer et al. | 346/76 L X |
| 4,785,311 | 11/1988 | Kaneko et al. | 346/76 PH X |
| 4,792,860 | 12/1988 | Kuehrle | 346/159 X |
| 4,851,926 | 7/1989 | Ishikawa | 346/160 X |
| 4,956,649 | 9/1990 | Sakai et al. | 346/135.1 X |
| 5,006,870 | 4/1991 | Hirahara et al. | 346/76 PH |
| 5,084,718 | 1/1992 | Yamuzaki et al. | 346/157 |
| 5,107,282 | 4/1992 | Morohoshi et al. | 346/153.1 |
| 5,198,842 | 3/1993 | Fujino et al. | 346/159 |

FOREIGN PATENT DOCUMENTS

| | | | |
|---|---|---|---|
| 2592836 | 7/1987 | France | 346/76 PH |
| 6059869 | 12/1985 | Japan . | |
| 63-297061 | 12/1988 | Japan . | |
| 2235680 | 9/1990 | Japan . | |
| 3253356 | 11/1991 | Japan . | |

*Primary Examiner*—Peter S. Wong
*Assistant Examiner*—Randy W. Gibson
*Attorney, Agent, or Firm*—Oblon, Spivak, McClelland, Maier & Neustadt

[57] ABSTRACT

An image forming apparatus includes an image carrier, a means for forming colorant holding regions on the image carrier, the colorant holding regions having better ink or developing agent holding properties than the image carrier, a means for supplying a colorant to the colorant holding regions, and a means for transferring the colorant, held in the colorant holding regions, onto a printing medium.

20 Claims, 14 Drawing Sheets

IMAGE FORMING APPARATUS HAVING COLORANT HOLDING REGIONS AND A COLORANT REPELLING REGION

BACKGROUND OF THE INVENTION

1. Field of the Invention

The present invention relates to an image printing apparatus for printing an image on a printing medium such as a plain paper and a plastic sheet by using an ink or a developing agent.

2. Description of the Related Art

As a conventional apparatuses for printing an image on a printing medium such as a paper, an ink-jet printing apparatus and a thermal transfer printing apparatus are known.

In an ink-jet printing method, ink drops are ejected from a small nozzle, and pixels are selectively formed on a printing medium by using the ink drops, thereby obtaining a desired image. This method is economically advantageous because pixels can be formed by ejecting an ink to only required portions. However, since a nozzle having a small diameter corresponding to the size of an ink image to be formed is used, clogging of the nozzle often occurs due to drying of an ink in the nozzle, precipitation of impurities therein, and the like. Especially in a multi-nozzle type head having a plurality of nozzles arranged in correspondence with the width of a printing sheet, it is difficult to solve this problem of clogging. Therefore, it is difficult to manufacture such a head for practical use.

In a thermal transfer printing method, an ink ribbon obtained by coating a hot-melt or a heat-sublimable ink on a support member composed of a polyester film or the like is used, and thermal energy is selectively applied to the ink ribbon by means of a thermal printing head or the like, thereby transferring the ink onto a printing medium. The thermal transfer printing method is advantageous in that an image having a relatively high contrast and excellent half-tone characteristics can be obtained. However, this ink ribbon cannot be repeatedly used, and the residual ink which is not transferred, and the support member on which the ink is coated are discarded after a printing operation. Therefore, this method is not economical.

With the recent widespread use of multi-media, video information tends to be easily processed in homes. Along with this tendency, the demand has arisen for a compact domestic image printer for obtaining a hard copy based on image information..

Meanwhile, a thermal transfer printer using a heat-sublimable ink is most popular as a compact domestic image printer. According to the sublimation type printer, a dye-ink ribbon is pressed against a printing sheet, and a thermal printing head behind the ink ribbon is heated to cause sublimation or thermal diffusion of the dye contained in the ink ribbon, thereby forming an image on the printing sheet. This system is capable of density modulation of about 64 to 256 tone levels per dot and hence is suitable for high-definition, multi-image printing, but is high cost with respect to recording paper.

The need for an electrophotographic printer represented by a laser beam printer increases on the market because it ensures high speed and high image quality. The principle of this laser beam printer will be briefly described below.

In the laser beam printer, the surface of a drum-like photoreceptor is charged to −600 V by a charger (precharge). A laser beam emitted from a laser diode is then deflected by a polygon mirror to one-dimensionally scan the charged photoreceptor. Exposure is imagewise performed by ON/OFF-controlling the output of the laser beam. Note that an actual apparatus includes a plurality of optical elements between the laser diode and the photoreceptor. Portions, of the charged photoreceptor, on which the laser beam is irradiated lose charges, and their potentials decrease to voltages near 0 V, thereby forming an electrostatic latent image. A bias voltage of −500 V is applied to a negatively charged toner to bring the toner near the photoreceptor on which the latent image is formed. Toner particles are attracted to only the portions on which the laser beam has been irradiated. As a result, a toner image is formed. The photoreceptor on which the toner image is formed is pressed against a printing sheet, and charges are applied from the rear surface side of the printing sheet by the charger, thus transferring the toner image to the printing sheet. The toner image on the printing sheet is heated by a heat roller to be fixed. With this operation, printing is completed. Meanwhile, the photoreceptor which has passed the transfer section is uniformly discharged by a lamp, and the residual toner on the photoreceptor is cleaned by a blade or the like, thus restoring the initial state.

Although such an electrophotographic printer is advantageous in terms of operation speed and the like, a complicated printing process is required. Especially a laser beam printer requires a space for scanning a laser beam and hence tends to increase in size. In addition, with this increase in size, the weight of the printer tends to increase.

SUMMARY OF THE INVENTION

A thermal transfer printer using a sublimable ink is suitable for image printing. However, if this printer is used as a domestic printer, the printing cost is about three times higher than that of a general thermal transfer printer using heat-melting ink system. With regard to image quality, an image obtained in this system is inferior to that obtained by printing in solidity. Although an electrophotographic printer is superior in printing speed, its size tends to increase because of a complicated printing process.

The present invention has been made in consideration of the above situation, and has as its first object to provide a means for obtaining a printed image by forming ink pixels without using a nozzle for discharging an ink.

It is the second object of the present invention to provide an image printing apparatus which can obtain a high-contrast image having good half-tone characteristics by efficiently using an ink and an ink holding member without using an ink ribbon.

It is the third object of the present invention to provide a small image printer which can print an image which looks as solid as an image obtained by printing, at a running cost as low as that of the thermal transfer printer using melting ink.

It is the fourth object of the present invention to provide a compact, lightweight electrophotographic printer.

The present invention has been made to achieve these objects.

An apparatus of the present invention comprises an image carrier, means for forming colorant holding regions on the image carrier, the colorant holding regions having better colorant holding properties than the image carrier, means for supplying a colorant to the colorant holding regions, and means for transferring the colorant, held in the colorant holding regions, to a printing medium.

This apparatus includes the following six aspects.

According to the first aspect of the present invention, there is provided an image printing apparatus comprising an image carrier, means for forming ink holding regions on the image carrier to have a predetermined pattern, the ink holding regions having better ink holding properties, means for supplying an ink to the ink holding regions, means for selectively producing a potential difference in the ink held in the ink holding regions in accordance with an image signal so as to form a latent image in the ink holding regions, and means for transferring the ink, formed into the latent image, onto a printing medium.

In the first aspect, the ink is used as the colorant, and the colorant holding regions are formed into a predetermined pattern. The apparatus according to the first aspect includes the means, arranged between the colorant supplying means and the colorant transfer means, for selectively producing the potential difference in the ink held in the colorant holding regions in accordance with the image signal so as to form the latent image in the colorant holding regions.

According to the second aspect of the present invention, there is provided an image forming apparatus comprising an image carrier having a conductive layer and a photoconductive stacked on the conductive layer, means for forming ink holding regions, having a predetermined pattern, on the photoconductive layer, means for supplying an ink to the ink holding regions, means for substantially uniformly supplying charges to the ink held in the ink holding regions, irradiation means for irradiating light on the photoconductive layer in accordance with an image signal so as to selectively attenuate the charges of the ink by decreasing the resistance of the photoconductive layer, thereby forming a latent image in the ink holding regions on the basis of a potential difference in the ink, and means for transferring the ink formed into the latent image onto a transfer medium.

In the second aspect, the ink is used as the colorant, and the image carrier having the conductive layer and the photoconductive layer stacked on the conductive layer is used. The apparatus of the second aspect further includes the means, arranged between the colorant supplying means and the means for transferring the colorant to the printing medium, for substantially uniformly supplying charges to the colorant, and the means for irradiating light on the photoconductive layer in accordance with the image signal.

According to the third aspect of the present invention, there is provided an image printing apparatus comprising an image carrier, thermal transfer means for heating a sheet having an ink holding layer, which is different in ink holding properties from a surface of the image carrier, in accordance with an image signal, so as to transfer the ink holding layer to the image carrier, thereby forming ink holding regions, means for supplying an ink to the ink holding regions, and means for transferring the ink, held in the ink holding regions, to a printing medium.

In the third aspect, the ink is used as the colorant. As the means for forming colorant holding regions, the apparatus of the third aspect includes heating means and a transfer sheet essentially constituted by a base layer and a hot-melt transfer layer formed on the base layer and having colorant holding properties different from those of the base layer. The transfer sheet is heated/transferred by the heating means in accordance with an image signal, thus forming colorant holding regions on the image carrier.

According to the fourth aspect of the present invention, there is provided an image printing apparatus comprising an image carrier essentially constituted by a base layer and a hot-melt resin layer formed on the base layer and having ink holding properties different from those of the base layer, means, arranged on the base layer, for selectively heating the hot-melt resin layer through the base layer in accordance with an image signal, a member, arranged on the hot-melt resin layer, for transferring and removing the heated hot-melt resin, means for supplying an ink to ink holding regions formed by selectively removing the hot-melt resin layer, and means for transferring the supplied ink to a transfer medium.

In the fourth aspect, the ink is used as the colorant, and the image carrier is essentially constituted by a transfer sheet essentially constituted by a base layer and a hot-melt transfer layer formed on the base layer and having colorant holding properties different from those of the base layer. The colorant holding region forming means includes heat transfer means arranged on the base layer, and a removal member arranged on the hot-melt resin layer. When the hot-melt resin layer on the image carrier is heated/transferred to the removal member to be removed in accordance with an image signal, colorant holding regions are formed on the image carrier.

According to the fifth aspect of the present invention, there is provided an image printing apparatus comprising an image carrier essentially constituted by a member selected from the group consisting of a conductive member and a dielectric material, a transfer sheet essentially constituted by a base layer and a transfer layer consisting of a hot-melt dielectric material formed on the base layer so as to be brought into contact with the image carrier, means, arranged on the base layer, for heating the hot-melt dielectric layer through the base layer in accordance with an image signal, thereby forming image holding regions, means for supplying charges onto the image carrier, on which the image holding regions are formed, so as to form an electrostatic latent image in the image holding regions, and means for developing the electrostatic latent image.

In the fifth aspect, a developing agent is used as the colorant, the image carrier is essentially constituted by a dielectric member or a conductive member, and a colorant holding layer consists of a hot-melt dielectric material. The apparatus of the fifth aspect includes means, arranged between the means for forming colorant holding regions and the colorant supplying means, for supplying charges onto the image carrier on which the colorant holding regions are formed, thereby forming an electrostatic latent image in the colorant holding regions.

According to the sixth aspect of the present invention, there is provided an image printing apparatus comprising an image carrier having a first electrode layer, a pressure switching layer formed on the first electrode layer, a heating resistive layer formed on the switching layer, and a second electrode layer formed on the heating resistive layer, a transfer sheet essentially constituted by a base layer and an image holding layer consisting of a hot-melt dielectric material and formed on the base layer so as to be brought into contact with the image carrier, means, arranged on the base layer of the transfer sheet, for heating the hot-melt dielectric layer through the base layer in accordance with an image signal so as to transfer the dielectric layer to the image carrier, thereby forming image holding regions, means for supplying charges onto the image carrier, on which the image holding layer is formed, so as to form an electrostatic latent image in the image holding regions, and means for developing the electrostatic latent image by using a developing agent, wherein the image carrier on which the image is developed by using the developing agent is partially pressed against a printing medium, and a voltage is applied between the first and second electrodes to cause a current to flow to a region, of the switching layer, on which a pressure is applied, so as to generate Joule heat, thereby fixing the non-fixed developing agent on the printing medium by using the Joule heat.

In the sixth aspect, the image carrier includes the first electrode layer, the pressure switching layer, the heating resistive layer, and the second electrode layer. The transfer means is constituted by a press member. The press member is partially pressed against the image carrier through a printing medium. A voltage is then applied between the first and second electrode layers to cause a current to flow to a pressed region of the pressure switching layer so as to generate Joule heat. The non-fixed developing agent on the printing medium is fixed by using the Joule heat.

According to the first and second aspects of the present invention, there are provided an image printing method and apparatus, which can obtain a printed image without using a nozzle for forming ink pixels, and can selectively transfer an ink to a printing medium so as to ensure economical advantages.

In addition, the ink holding layer for holding an ink is formed into a drum-like or belt-like shape to be used in an endless manner, thus realizing the effective use of the ink holding layer and ink.

According to the third and fourth aspects of the present invention, ink holding regions are selectively formed on the image carrier in accordance with an image signal so that the image carrier can be used in the same manner as a plate for lithographic printing. When lithographic printing is performed by using such an image carrier and a printing ink, image printing can be performed at a low running cost as compared with a thermal transfer printer using a sublimable ink, and at the same time an image which looks solid and has image quality equivalent to that obtained by press printing can be obtained.

According to the fifth and sixth aspects of the present invention, many components used in an electrophotographic printer can be omitted, thus realizing a compact, lightweight, portable electrophotographic printer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An apparatus according to the present invention basically comprises an image carrier, a means for forming colorant holding regions on the image carrier, the colorant holding regions having better colorant holding properties than the image carrier, a means for supplying a colorant to the colorant holding regions, and a means for transferring the colorant, held in the colorant holding regions, onto a printing medium.

A potential difference in this case serves to cause different transfer operations in the transfer mode in accordance with the potential difference. As such a potential difference, for example, an electric potential difference based on electric energy, a temperature difference based on thermal energy, or a molecular bonding force difference based on chemical energy can be used. These different potential differences may be used together.

The present invention roughly includes six embodiments.

Each embodiment will be described below with reference to the accompanying drawings.

According to the first embodiment of the present invention, there is provided an image printing apparatus comprising an image carrier, a means for forming ink holding regions on the image carrier to have a predetermined pattern, the ink holding regions having better ink holding properties, a means for supplying ink to the ink holding regions, a means for selectively producing potential differences in the ink held in the ink holding regions in accordance with an image signal so as to form a latent image in the ink holding regions, and a means for transferring the ink, formed into the latent image, onto a printing medium.

Figure 1:
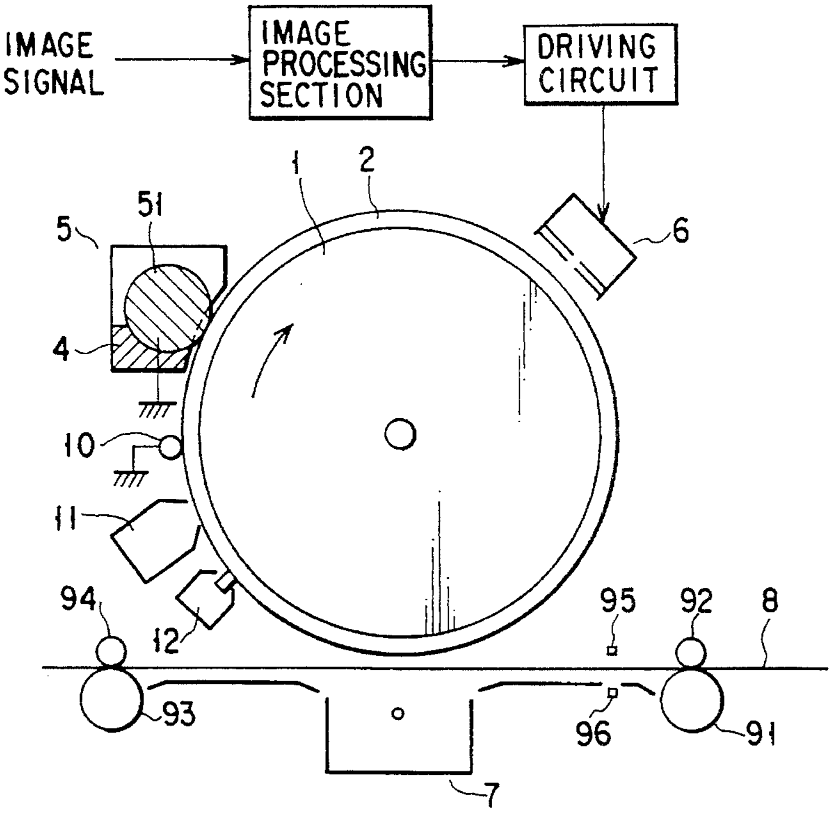
FIG. 1 is a view showing a schematic arrangement of an image printing apparatus according to the first embodiment of the present invention.

FIG. 1 shows a schematic arrangement of an image printing apparatus according to the first embodiment of the present invention. An ink supplying section 5, a charge supplying section 6, and a transfer section 7 are arranged along the outer surface of a cylindrical drum 1.

The overall operation of the apparatus will be described first.

A driving force is transmitted from a motor (not shown) or the like to the central shaft of the drum 1. The drum 1 is then rotated in the direction indicated by the arrow in FIG. 1 in accordance with commands from a CPU (not shown) or the like. Upon rotation of the drum 1, an image signal from the CPU, a transmission system, a memory, or the like is processed by an image processing section, and the resultant signal is supplied to a charge supplying section 6 through a driving circuit, thus operating the respective components.

Figure 2A:
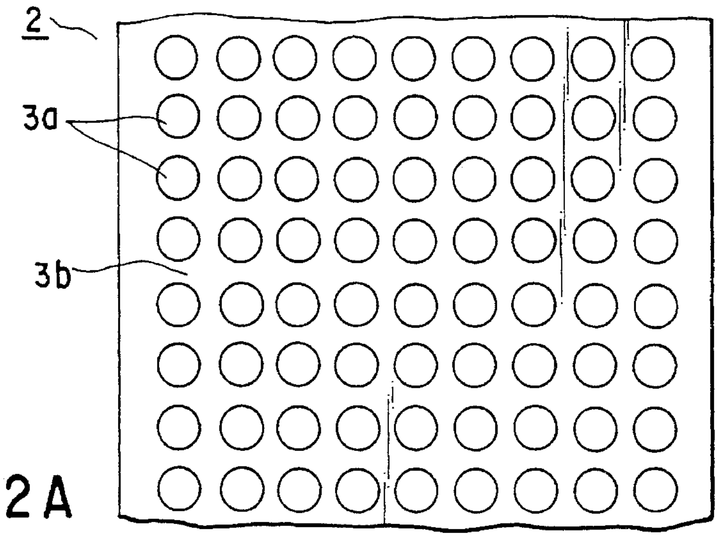
FIG. 2A is a schematic plan view of a schematic arrangement of an ink holding layer used in the image printing apparatus of the present invention.

The drum 1 has an ink holding layer 2 formed on its surface. As shown in FIG. 2A, a pattern corresponding to ink holding regions 3*a* having good ink holding properties is formed on the ink holding layer 2 by a pattern forming section 11 arranged on the drum 1. With this operation, the ink holding layer 2 is divided into the ink holding regions 3*a* and a region 3*b* having poor ink holding properties. Owing to the difference between the ink holding properties on the ink holding layer 2, an ink supplied onto the ink holding layer 2 is held in the ink holding regions 3*a* until the ink reaches the charge supplying section 6 (to be described next). In FIG. 1, the ink holding regions 3*a* are formed on the ink holding layer 2 by using the pattern forming section 11. If, however, an ink holding layer 2 on which ink holding regions 3*a* are formed in advance is formed on the drum, the pattern forming section 11 can be omitted. In addition, the formation of the ink holding regions 3*a* by means of the pattern forming section 11 need not be performed for each image printing process, and the formed ink holding regions 3*a* can be used repeatedly.

Subsequently, the charge supplying section 6 selectively supplies charges to the ink held in the ink holding regions 3*a* on the basis of the image signal. That is, the ink separately held in a plurality of regions on the ink holding layer 2 is divided into ink portions to which the charges are supplied and portions to which no charges are supplied. In this manner, a latent image is formed in the ink regions.

In the transfer section 7, only the ink portions to which the charges are supplied from the charge supplying section 6 are selected from the ink held on the ink holding layer 2 and are transferred onto a printing medium 8, e.g., plain paper or a plastic sheet, which is arranged to oppose the transfer section 7.

After the transfer operation, the residual ink is recovered by, e.g., an ink recovery section 12. However, if the formed pattern is to be used again without changing it, the ink recovery section 12 may not be operated. Even if the residual ink is not recovered, since the ink holding layer 2 has been divided into the ink holding regions 3*a* having good ink holding properties and the region 3*b* having poor ink holding properties, even the ink which is supplied onto the ink holding layer 2 while the residual ink is left thereon can be substantially uniformly held in the overall regions 3*a* having good ink holding properties. The charges on the ink holding layer 2 are then removed by a discharge means 10.

As described above, when charges are selectively supplied to ink regions by the charge supplying section 6 on the basis of an image signal, an image based on the image signal is printed on the printing medium 8.

The respective components will be described in detail below.

The ink holding layer 2 formed on the surface of the drum 1 has a function of separately holding ink portions as pixels in the ink holding regions 3*a* formed by the pattern forming section 11. As shown in FIG. 2A, the ink holding layer 2 is divided into the regions 3*a* having good ink holding properties and the region 3*b* having poor ink holding properties. Referring to FIG. 2A, the regions 3*a* are regularly arranged lengthwise and widthwise. As the ink holding layer 2, a polyester film having good water repellency can be used. As an ink, a water-based ink is used. A polyester film exhibits very poor holding properties with respect to a water-based ink. For this reason, a flat polyester film cannot hold ink. However, the regions 3*a* having good ink holding properties are obtained by forming fine recesses or holes in portions of the surface of the polyester film. That is, the ink holding properties of these portions are improved. Therefore, when an ink is supplied to the ink holding layer 2, the ink cannot be held in the region 3*b* having poor ink holding properties and will soon be agglomerated on the surfaces of the regions 3*a* having good ink holding properties so as to be held in the recesses or holes formed in the surfaces.

Figure 2B:
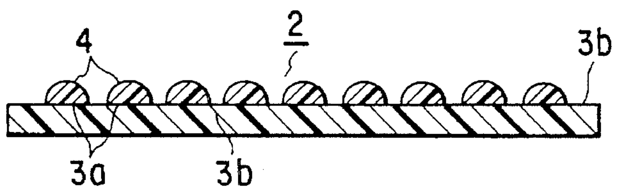
FIG. 2B is a schematic sectional view of the ink holding layer used in the image printing apparatus of the present invention.

The ink supplying section 5 has a spongy roller 51 having a soft surface. The roller 51 is in contact with the ink holding layer 2 at a proper pressure while the spongy structure of the roller 51 is impregnated with an ink 4. When the roller 51 is rotated upon rotation of the drum 1, the liquid ink 4 is uniformly coated on the ink holding layer 2. When the ink-coated region is separated from the roller 51 upon rotation of the drum 1, the ink is separated/held on the ink holding layer 2 owing to the difference between the ink holding properties thereon. FIG. 2B is a sectional view of the ink holding layer 2 which is holding the ink 4 in this state. The ink holding layer 2 is moved to the charge supplying section 6 upon rotation of the drum 1 while the above-mentioned state is maintained.

Figure 3:
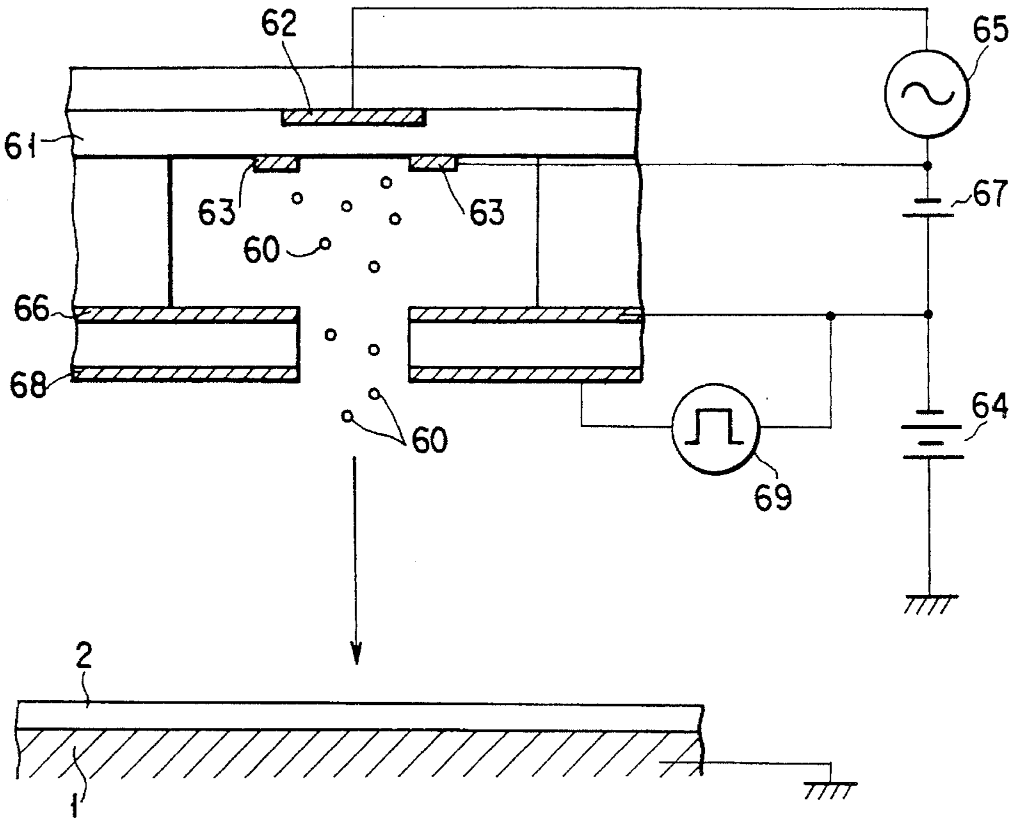
FIG. 3 is a view for explaining an operation of a charge supplying section.

FIG. 3 shows a detailed arrangement of the charge supplying section 6. FIG. 3 shows a case wherein a electric potential difference is utilized as a potential difference which contributes to a transfer operation. The charge supplying section 6 supplies charges to ink regions in order to produce electric potential differences. Furthermore, in this case, negative ions are supplied as charges, and the charge supplying section 6 is mainly constituted by an ion generating section and a pair of control electrodes for supplying ions.

An ion generating electrode 63 for generating ions is formed on one surface of a dielectric layer 61 consisting of polyimide or the like. An induction electrode 62 is formed on the other surface of the dielectric layer 61. When an AC voltage 65 is applied between the ion generating electrode 63 and the induction electrode 62, an alternating electric field is generated to generate positive and negative ions near the ion generating electrode 63. Only negative ions 60 move toward one control electrode 66, of the control electrode pair, which is located closer to the ion generating electrodes 63, owing to a bias voltage 67 applied between the control electrode 66 and the ion generating electrode 63. At this time, a signal voltage 69 is applied between the control electrode 66 and the other control electrode 68 to move the ions toward the control electrode 68, thus causing the ions 60 to pass the control electrodes 66 and 68. In this case, the signal voltage 69 is set such that the potential of the control electrode 68 is equal to or slightly higher than that of the control electrode 66. The ions which have passed the pair of control electrodes 66 and 68 are accelerated by a voltage 64 and are supplied in the direction indicated by the arrow in FIG. 3. In contrast to this, when no ions are to be supplied, the signal voltage 69 is set such that the potential of the control electrode 68 is lower than that of the control electrode 66, thereby inhibiting the passage of the ions 60.

Figure 4:
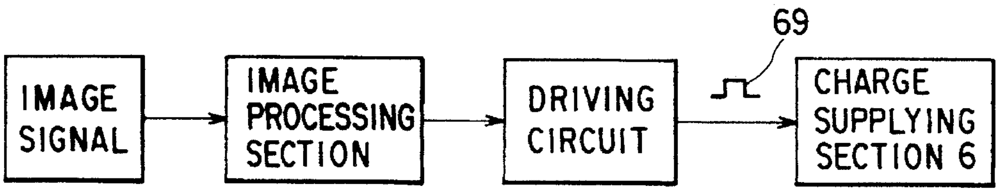
FIG. 4 is a block diagram showing the steps in processing an image signal.

In this manner, the supply of ions, i.e., charges, is performed by ON/OFF-controlling the signal voltage 69. FIG. 4 is a block diagram showing an arrangement including components ranging from an image signal input portion to the charge supplying section 6. As shown in FIG. 4, an image signal output from a scanner or a video camera (neither is shown) or transmitted through a computer or a transmission path is converted by an image processing section as needed, and is supplied to a driving circuit, thus controlling the signal voltage 69.

Figure 5:
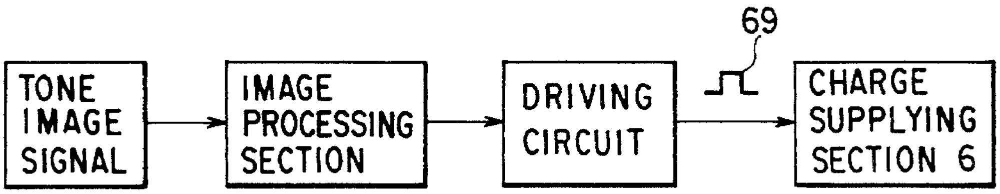
FIG. 5 is a block diagram showing the steps in processing a tone image signal.

Note that this apparatus can perform tone printing. FIG. 5 is a block diagram showing an arrangement for tone printing, which includes components ranging from an image signal input portion to the charge supplying section 6.

Referring to FIGS. 4 and 5, as an image signal or a tone image signal, data obtained by A/D-converting data from a scanner or a video camera, digital data from a computer or the like, data from various types of memories, or the like can be used.

The image processing section is a block for converting an image signal or a tone image signal as needed. The image processing section performs various types of filter processing such as high-pass filter and low-pass filter processing, color conversion processing, density correction processing, tone control processing, and the like.

Figure 6:
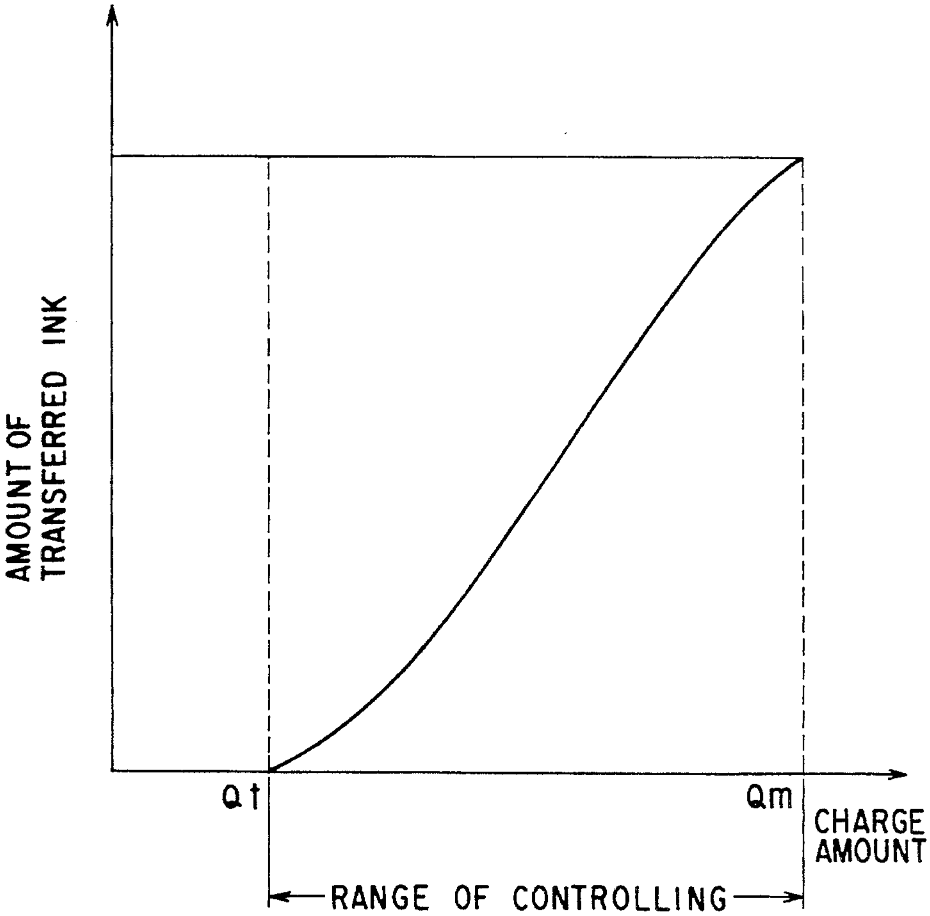
FIG. 6 is a graph showing the relationship between the amount of charges supplied to an ink and the amount of ink transferred to a printing medium.

Tone control processing is for tone printing, in which the application time of the signal voltage 69 is set in accordance with, e.g., data associated with an image signal. The signal voltage 69 is controlled by the driving section on the basis of the application time set in this processing. The application time of the signal voltage 69 corresponds to the amount of charges supplied to an ink. FIG. 6 is a graph showing the relationship between the amount of charges and the amount of ink transferred to a printing medium. As indicated by this graph, if the amount of charges supplied does not reach an amount Qt, a potential difference allowing a transfer operation cannot be obtained. For this reason, the ink neither swells nor drifts. If, however, the amount of charges exceeds the amount Qt, the transfer amount of ink in holding regions to which the charges are supplied is increased in accordance with the amount of charges. When the amount of charges exceeds an amount Qm, all the ink in the holding regions to which the charges are supplied is transferred. The transfer amount becomes constant. Therefore, the application time may be controlled within the range of the charge amount Qt or Qm in accordance with an image signal.

By controlling the application time in this manner, the amount of charges supplied can be easily controlled, and tone printing is facilitated.

When positive charges are to be supplied unlike the above-described case, a printing operation can be performed with the same arrangement as that described above by properly changing the polarities and values of the signal voltage 69, the bias voltage 67, and the voltage 64. As disclosed in Japanese Patent Application No. 02-51832 and the like filed by the present applicant, these charge supplying means can be variously modified and applied to the present invention.

Figure 7:
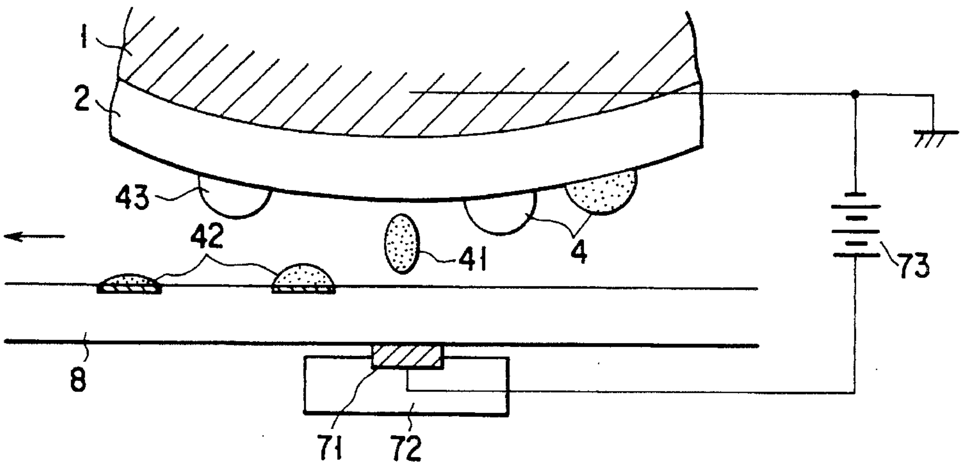
FIG. 7 is a view for explaining an operation of a transfer section.
Figure 8:
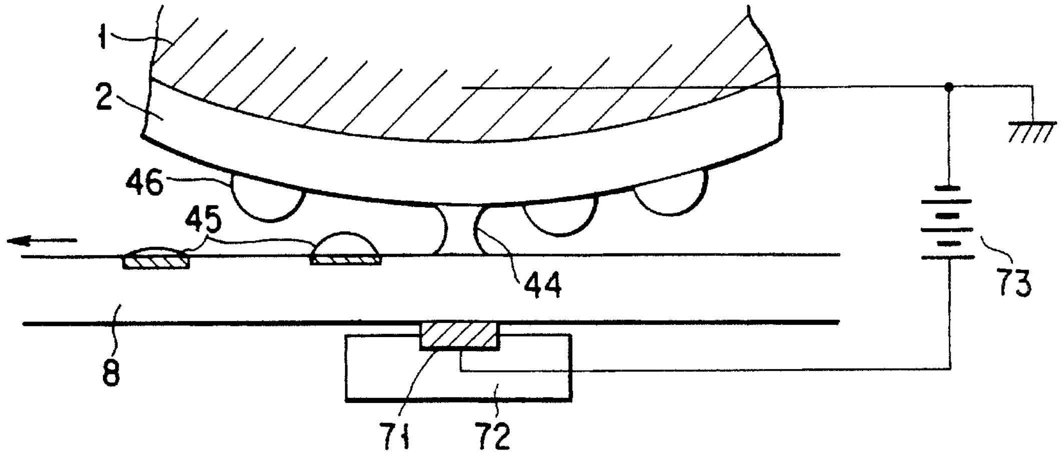
FIG. 8 is a view for explaining another operation of the transfer section.

FIGS. 7 and 8 are view for explaining the arrangement and operation of the transfer section 7. In the transfer section 7, an electric field is applied to an ink to cause an electrostatic force to act thereon, thereby transferring the ink onto the printing medium 8.

A transfer electrode 71 formed on a substrate 72 is arranged on the lower surface side of the printing medium 8 placed to oppose the ink holding layer 2 through a gap. A transfer voltage 73 is applied between the inner surface of the ink holding layer 2, i.e., the drum 1, and the transfer electrode 71. The magnitude of the transfer voltage 73 is set such that ink portions, of the ink 4 held on the ink holding layer 2, to which no charges are supplied from the charge supplying section 6 are not transferred, but only the ink portions to which charges are supplied from the charge supplying section 6 are transferred onto the printing medium 8.

In the transfer process, if the gap between the ink holding layer 2 and the printing medium 8 is relatively large, transfer is performed by drifting the ink. FIG. 7 is a schematic view showing a state in which transfer is performed by drifting the ink. As shown in FIG. 7, an electrostatic force is caused to act on the ink 4 held on the ink holding layer 2 by using a transfer electric field formed by the transfer voltage 73, and the ink 41 to which charges are supplied from the charge supplying section 6 is drifted toward the printing medium 8 by this electrostatic force, thereby performing transfer. An ink 42 which has reached the printing medium 8 forms ink dots on the surface of the printing medium 8 or in its surface upon penetration therein. Meanwhile, an ink 43 to which no charges are supplied from the charge supplying section 6 passes, as a residual ink, the transfer section 7 while it is held on the ink holding layer 2.

when the gap between the ink holding layer 2 and the printing medium 8 is relatively small, transfer is performed by causing the ink to swell. FIG. 8 is a schematic view showing a state in which transfer is performed by causing the ink to swell. As shown in FIG. 8, an electrostatic force is caused to act on the ink held on the ink holding layer 2 by using a transfer electric field formed by the transfer voltage 73, and the ink to which charges are supplied from the charge supplying section 6 swells toward the printing medium 8 owing to this electrostatic force, thereby performing transfer. In this case, when a swelled ink 44 reaches the surface of the printing medium 8, since the ink holding properties of the printing medium 8 are superior to those of the ink holding layer 2, the ink is transferred onto the printing medium 8. As a result, ink dots 45 are formed on the printing medium 8 in the same manner as in the case shown in FIG. 7.

The method of transferring an ink onto the printing medium 8 by causing the ink to swell is advantageous in that a transfer operation can be performed by using a relatively low transfer voltage. However, the gap between the ink holding layer 2 and the printing medium 8 must be set such that an ink is brought into contact with the printing medium 8 only when the ink swells.

In contrast to this, in the method of transferring ink onto the printing medium 8 by drifting the ink, only the ink portions which are drifted from the ink holding layer 2 are transferred, so that at least a transfer operation can be ensured by setting a transfer voltage based on a level at which drifting occurs. That is, the reliability with respect to noise is relatively high.

As described above, the ink to which charges are selectively supplied from the charge supplying section 6 on the basis of an image signal is transferred onto the printing medium 8, and a printed image formed by the ink based on the image signal is obtained. Note that as this transfer voltage, a constant voltage may be applied during a transfer operation of the ink onto the printing medium.

The printing medium 8 is moved to the transfer section 7 in the following manner.

Referring to FIG. 1, the printing medium 8 is conveyed to the transfer section 7 by a convey means having convey rollers 91 and 93 and the like, which are rotated by the driving force of a motor or the like (not shown), in synchronism with the rotation of the drum 1. Generally, a sensor constituted by a pair of light-emitting and light-receiving elements 95 and 96 is arranged in front of the transfer section 7 so as to detect the entrance of the printing medium 8. The printing medium 8 is set in a standby state at the position of the sensor to control the feed timing of the printing medium 8 such that the position of the ink on the drum 1, which is to be transferred, coincides with a position on the printing medium 8 to which the ink is to be transferred. The printing medium 8 is conveyed to the transfer section 7 by driving the convey roller 91 at this timing. Furthermore, normally, a transfer operation is continuously performed to continuously convey the printing medium 8 at a speed proportional to the rotational speed of the drum 1.

The printing medium 8 which has undergone the transfer operation is discharged by the convey roller 93 arranged at the outlet side.

When the drum 1 is further rotated, the regions of the ink holding layer 2 which have passed the transfer section 7 are discharged by the discharge means 10 and then are moved to the ink supplying section 5. In this case, the residual ink (the ink 43 in FIG. 7 or the ink 46 in FIG. 8) which is not transferred onto the printing medium 8 by the transfer section 7 and is left on the ink holding layer 2 is used for the next printing operation by the ink supplying section 5 together with the ink stored therein. By circulating the ink holding layer 2 in this manner, the holding layer 2 can be used repeatedly. The residual ink can be efficiently used with the repeated use of the ink holding layer 2. These advantages are especially enhanced by minimizing the number of members which are brought into contact with the ink holding layer 2 to prevent the ink holding layer 2 from deteriorating due to wearing and damage.

On the ink holding layer 2, a region having good ink holding properties and a region having poor ink holding properties can be obtained as follows. Thermal energy is partially applied to a portion in which a region having good ink holding properties is to be formed. As a result, at least the surface of the portion partially shrinks or a mold release agent such as fluoroplastic uniformly coated on the surface in advance is partially removed, thus obtaining a region having good ink holding properties. Alternatively, such a region may be obtained not by mechanical distortion but by modifying the surface by means of heat or irradiation.

Figure 9:
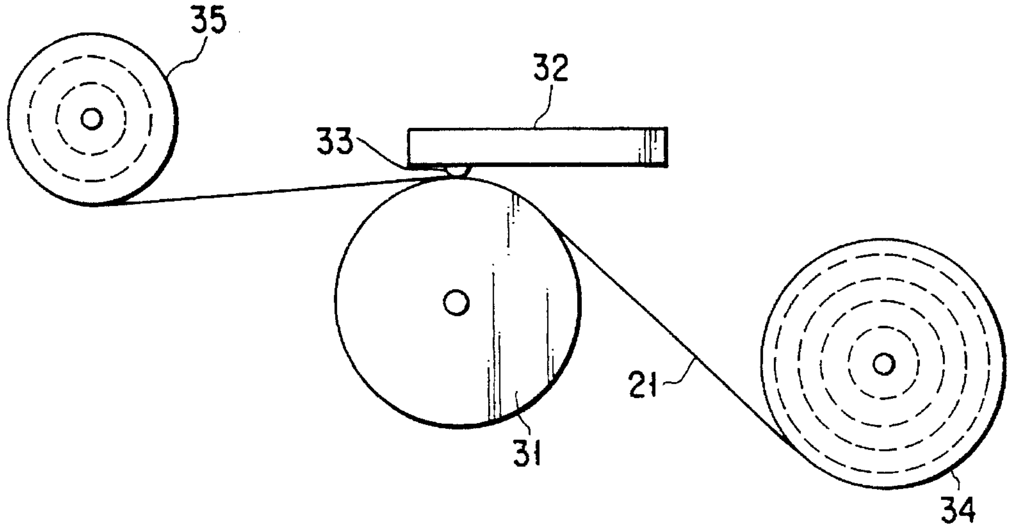
FIG. 9 is a view showing a schematic arrangement of a unit for forming an ink holding layer.

The method using heat allows easy formation of a holding region with a relatively simple arrangement. This method will be described below. FIG. 9 shows a schematic arrangement of an unit for forming a region having good ink holding properties on a partial region of a holding member 21 consisting of a polyester sheet, e.g., polyethylene telephthalate. In this arrangement, a polyester sheet is inserted between a platen 31 constituted by a cylindrical rubber roller and a thermal printing head 32. The polyester sheet 21 is conveyed from a feed roller 34 to a take-up roller 35 at a constant speed while a proper pressing force is applied to the sheet 21. A plurality of heating elements 33 are arranged on the thermal printing head 32 in the direction of depth in FIG. 9. The heating elements 33 of the thermal printing head 32 are selectively driven by an external signal based on a driving circuit (not shown) to apply heat energy to the polyester sheet surface. As the thermal printing head 32, a thermal printing head used as the printing section of a general facsimile apparatus can be used. When each position on the holding member 21 at which a region having good ink holding properties is to be formed reaches the position of a corresponding one of the heating elements 33, the thermal printing head 32 is driven to apply heating energy of about 300° C. to the ink holding layer 21. Thermal shrinkage then occurs at each thermal pattern portion, of the holding member 21, to which the heating energy is applied from the thermal printing head 32. With this operation, the ink holding properties of each thermal pattern portion are improved, thereby obtaining a region having poor ink holding properties and regions having good ink holding properties. With this procedure, ink holding regions can be formed into a regular two-dimensional pattern to manufacture the ink holding layer 2 shown in FIG. 2A. In order to form the ink holding layer 2 into a cylindrical shape, the layer is cut into a proper size as needed, and the cut layer is bonded to the surface of the drum 1 with an adhesive. Although the thickness of the ink holding layer used in the present invention is not specifically defined, if the polyester sheet used in the above-described arrangement shown in FIG. 6 is used, the thickness is preferably set to be 50 μm to 200 μm, and optimally about 100 μm, in consideration of the degree of freedom in conveyance or handling in mounting the sheet on the drum.

Figure 10A:
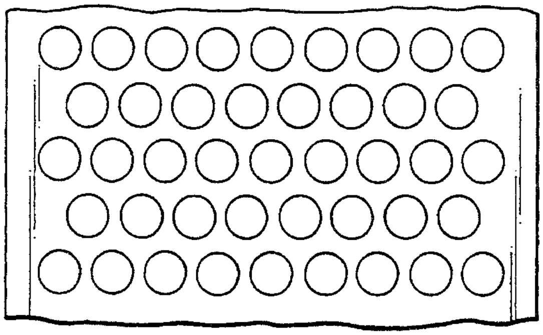
FIG. 10A is a plan view of another ink holding layer.
Figure 10B:
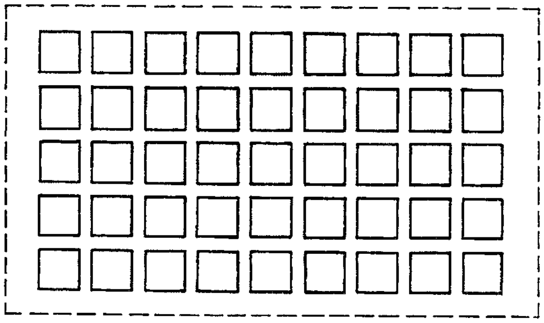
FIG. 10B is a plan view of still another ink holding layer.
Figure 10C:
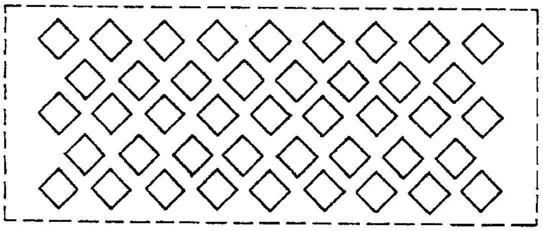
FIG. 10C is a plan view of still another ink holding layer.
Figure 17:
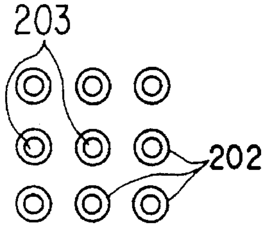
FIG. 17 is a view showing another ink holding layer used in FIGS. 15A to 15C.
Figure 18:
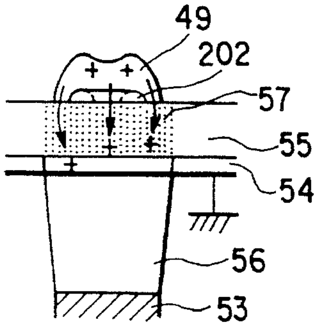
FIG. 18 is a sectional view showing still another example of how a potential difference is produced by irradiation.

In addition, for example, regions having good ink holding properties can be formed into a regularly dotted pattern by controlling the drive timing of the heating elements 33 of the thermal printing head 32. FIG. 10A shows a pattern obtained in such a manner. Furthermore, each of the pattern constituent elements in the ink holding regions on an ink holding layer need not necessarily have a circular shape, and elements having various shapes such as elliptical, rectangular, and rhombic shapes can be used. FIGS. 10B, 10C and 17 show such elements.

Note that regions having good ink holding properties need not always be arranged regularly. A desired region pattern can be formed on the ink holding layer 2 by controlling a signal for driving the thermal printing head 32 on the basis of an image signal or the like.

In addition, pattern constituent elements need not always be arranged in a one-to-one correspondence with the dots of an image to be formed. Assume that a plurality of pattern constituent elements are caused to correspond to one dot. In this case, even if some of a plurality of pattern constituent elements are not sufficiently transferred, a large defect in an image can be prevented.

The image carrier used in the present invention has ink holding regions formed on its surface. For this reason, the surface of the image carrier is divided into ink holding regions having good ink holding properties and the remaining region, i.e., a region having poor ink holding properties.

These ink holding regions can be obtained by forming an ink holding layer on the surface of the base member of the image carrier, and performing thermal processing or treatment with respect to the ink holding layer to form a predetermined pattern. Alternatively, various types of metals may be formed on a substance having poor ink holding properties into a predetermined pattern by means of vacuum deposition, electrolytic plating, electroless plating, or the like, thus obtaining ink holding regions. In addition, a region having poor ink holding properties may be formed in a partial region of a region as a base having good ink holding properties. In this case, a method of partially coating, for example, various types of mold release agents by means of a spray or the like can be used.

A material for an ink holding layer is selected in consideration of the following points. The main function of an ink holding layer is to hold an ink upon separating it into a predetermined pattern. The loss of an ink due to the influence of a holding layer is preferably minimized. For this reason, a material which inhibits penetration of an ink is suitable for a holding layer. In addition, a material which is highly resistant to a deterioration such as erosion due to contact with an ink is suitable. Furthermore, a material which inhibits escape of charges to be supplied to an ink is suitable. For this reason, a material which has a relatively low conductivity with respect to an ink and is substantially insulated is suitable.

As such materials, for example, a polyester film consisting of polyethylene telephthalate or the like, a fluororesin film consisting of polytetrafluoroethylene or the like, a heat-resistant polymer film consisting of polyimide or the like, a silicone resin film, and a polycarbonate film can be used.

As an ink to be used in the present invention, an ink which can be sufficiently held in regions having good ink holding properties and can be transferred onto a printing medium after it is formed into a latent image on the basis of potential differences selectively applied to the ink regions is selected. A water-based ink, an oil-based ink, a neutral ink, or the like can be used as long as it has the above-described characteristics. In addition, an ink which is solid at room temperature can be used.

A modification of the first embodiment of the present invention will be described below.

Figure 11:
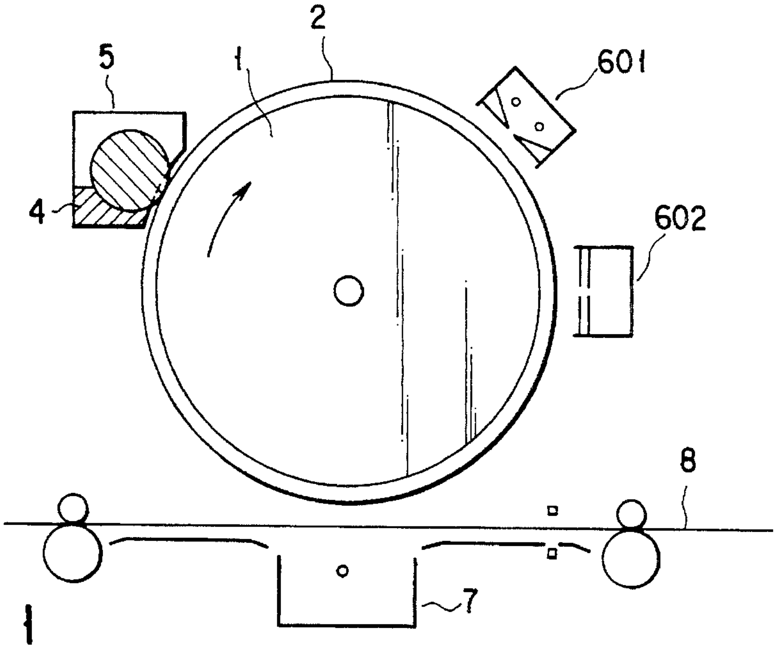
FIG. 11 is a view showing a schematic arrangement of a modification of the image printing apparatus according to the first embodiment of the present invention.

FIG. 11 shows a schematic arrangement of an image printing apparatus according to a modification of the first embodiment of the present invention.

The large difference between the modification and the first embodiment is that the modification has two charge supplying sections as potential difference generating means.

An operation of the modification will be briefly described below. Similar to the operation described with reference to FIG. 1, an ink 4 is supplied to an ink holding layer 2 in an ink supplying section 5. This ink 4 is held in regions having good ink holding properties and is moved to a first charge supplying section 601, by which charges are uniformly supplied to the ink 4. The charges supplied here are negative ions, and hence the ink 4 on the ink holding layer 2 is entirely charged to the negative polarity. In a second charge supplying section 602, charges are selectively supplied to the ink regions on the basis of an image signal. In this case, the supplied charges are positive ions and hence serve to selectively cancel the polarity of the ink charged by the first charge supplying section 601 or at least weaken it. In this manner, the charges supplied by the first charge supplying section 601 are held in ink regions from which the charges are not removed by the second charge supplying section 602. As a result, a latent image is formed in the ink holding regions. In this state, the ink is moved to a transfer section 7. Similar to the first embodiment, in the transfer section 7, the ink portions having charges are selectively transferred onto a printing medium 8. Therefore, the ink regions to which the charges have been selectively supplied from the second charge supplying section 602 are not transferred onto the printing medium 8. The second charge supplying section 602 is driven on the basis of an image signal representing so-called negative image obtained by processing an image signal in advance.

Potential differences are produced in ink regions by the first and second charge supplying sections in the above-described manner to print an image formed by an ink on a printing medium in accordance with the potential difference.

With this arrangement, even if some ink portions have charges as noise before they reach the first charge supplying section, since charges are uniformly supplied by the first charge supplying section, the noise can be removed as long as the value of the noise is small.

In this case, the arrangement shown in FIG. 3 can be applied to the two charge supplying sections 601 and 602 by properly changing the polarities of applied voltages and the like. Especially, since the first charge supply section need not selectively supply charges, a general corona charger used in a copying machine or the like can be used as the first charge supplying section.

In addition, the positions of the first and second charge supplying sections 601 and 602 can be exchanged. In this case, after the second charge supplying section 602 selectively supplies charges to an ink in accordance with an image signal, charges having a polarity opposite to that of the charges supplied by the second charge supplying section 602 may be supplied to the overall ink in the ink holding regions by the first charge supplying section 601, thereby canceling the charges which have already been supplied, and supplying new charges to the remaining regions. Even with this arrangement, a potential difference similar to that described above can be obtained in effect, and hence a printed image can be obtained in the transfer section.

Another modification of the first embodiment of the present invention will be described next.

Figure 12:
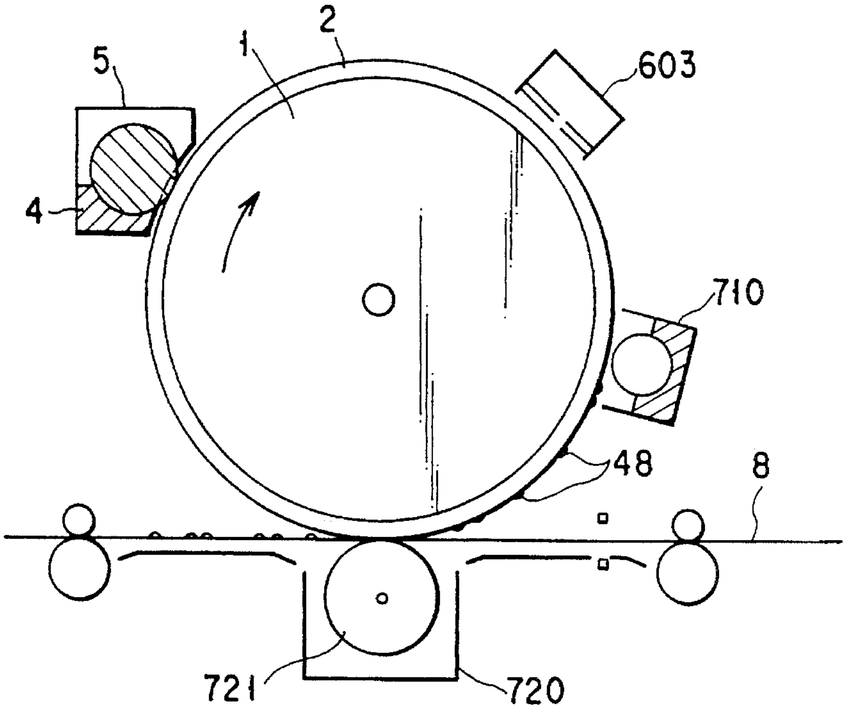
FIG. 12 is a view showing a schematic arrangement of another modification of the image printing apparatus according to the first embodiment of the present invention.

FIG. 12 shows a schematic arrangement of an image printing apparatus according to another modification of the first embodiment of the present invention. Similar to the previous modification, a charge supplying section 603 having the same arrangement as that of the second charge supplying section 602 in the previous modification selectively supplies positive charges to an ink supplied to an ink holding layer 2 in an ink supplying section 5. In this case, an image signal used to select ink regions is processed in advance as in the previous modification of the present invention. That is, an image signal representing negative image is obtained in advance.

Subsequently, the ink portions to which the charges have been selectively supplied are removed from the ink holding layer 2 in a first transfer section 710. A residual ink 48 held on the ink holding layer 2 without being removed is moved to a second transfer section 720. In the second transfer section 720, the residual ink 48 is transferred onto a printing medium 8 to form printed dots 49, thereby obtaining a printed image.

Figure 13:
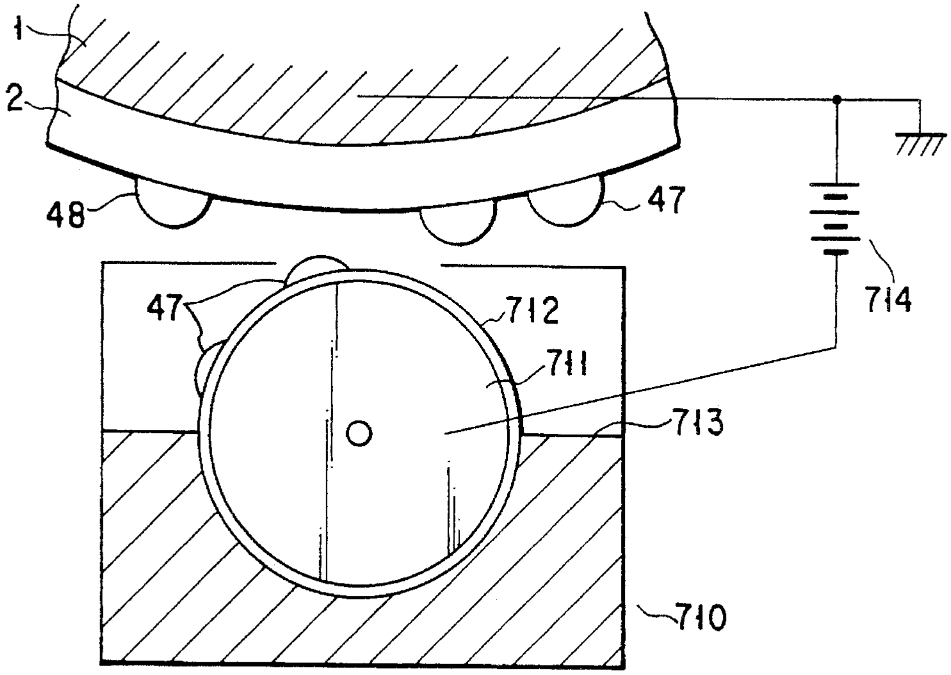
FIG. 13 is a view for explaining an operation of a transfer section in FIG. 12.

FIG. 13 shows a detailed arrangement of the first transfer section 710. A drum 711 also serves as a transfer electrode having an insulating resin 712 coated on its circumferential portion. The ink latent image having the positive charges and held on the ink holding layer 2 is transferred onto the drum 711 by negative charges generated by a voltage 714 applied to the drum 711. With this operation, an unnecessary ink is removed. A transfer operation is performed in the same manner as in the transfer section 7 described before. The drum 711 is being rotated by a driving means such as a motor (not shown), and the transferred ink is recovered by a spongy ink recovery pad 713.

The second transfer section 720 includes a transfer roller 721, which is pressed against a drum 1 through the printing medium 8 with a predetermined pressing force. The transfer roller 721 is a rubber roller consisting of silicone rubber or the like. The transfer roller 721 does not have its own power and hence is rotated upon rotation of the drum 1. When the residual ink 48 passes the first transfer section 710 and reaches the second transfer section 720, the printing medium 8 is conveyed to the second transfer section 720 by the same convey means as that shown in FIG. 1. The printing medium 8 is then brought into contact with the ink held on the ink holding layer 2. As a result, the ink is transferred onto the printing medium 8 to obtain a printed image.

In this arrangement, since the ink is transferred onto a printing medium by bringing the medium into contact with the ink holding layer, a transfer operation can be performed by using a predetermined pressing force as well as the adhesive force of the ink itself, allowing reliable, easy transfer of the ink.

In each of the three types of apparatuses according to the first embodiment of the present invention, an ink holding layer is formed on the surface of the drum. However, an ink holding layer is not limited to a cylindrical shape and may have a sheet-like shape or an endless belt-like shape.

when a sheet-like ink holding layer is to be used, the apparatus may include a convey means for properly conveying the sheet-like ink holding layer to the respective portions. In addition, if a circulatory convey path is formed, the ink holding layer and ink can be effectively used. Furthermore, in order to facilitate conveyance of the sheet-like ink holding layer, an auxiliary member may be formed on the lower surface of the ink holding layer.

An endless belt-like ink holding layer is suitable for the circulatory use of the ink holding layer as in the embodiment using the above-described drum. In addition, the use of such a layer increases the degree of freedom in the shape of the apparatus.

In this apparatus, after such a potential difference is produced, the ink is transferred from the image carrier to the printing medium by using the potential difference. If, for example, a potential difference based electric energy is to be used, a transfer means for applying an electrostatic force is used to transfer an ink to a printing medium by using the potential difference in the ink. In this manner, a potential difference is selectively produced in an ink in ink holding regions on the basis of an image signal so as to form an ink latent image, and the ink latent image is transferred by using the potential difference. According to such an apparatus, a desired ink can be easily transferred to a printing medium. In addition, according to this apparatus, since no nozzle for discharging an ink is required to form ink pixels, there is no need to worry about clogging of a nozzle as in ink-jet printing.

According to the apparatus, the image carrier can be used repeatedly in an endless manner. The reuse of the residual ink left on the image carrier without being transferred allows effective use of the image carrier and ink. The residual ink may be recovered to be used again. Even if the residual ink is not recovered, since the surface of the image carrier is divided into regions having good ink holding properties and a region having poor ink holding properties, an ink further supplied onto the image carrier can be satisfactorily held in the regions having good ink holding properties while the residual ink is left. As described above, the image carrier can be repeatedly used, and a liquid ink can be used as in the conventional ink-jet printing system, thereby providing an image printing apparatus which realizes a reduction in running cost as compared with a thermal transfer printing apparatus using an ink ribbon.

According to the second embodiment of the present invention, there is provided an image forming apparatus comprising an image carrier having a conductive layer and a photoconductive layer stacked on the conductive layer, a means for forming ink holding regions, having a predetermined pattern, on the photoconductive layer, a means for supplying an ink to the ink holding regions, a means for substantially uniformly supplying charges to the ink held in the ink holding regions, irradiation means for irradiating light on the photoconductive layer in accordance with an image signal so as to selectively attenuate the charges of the ink by decreasing the resistance of the photoconductive layer, thereby forming a latent image in the ink holding region on the basis of a potential difference in the ink, and a means for transferring the ink formed into the latent image onto a transfer medium.

The second embodiment of the present invention will be described below.

In the above-described embodiment, the charge supplying section for generating ions is used to generate a potential difference. This charge supplying section can selectively supply charges in accordance with an image signal by causing ions to directly act on the ink. In contrast to this, in the following apparatus, a laminated member constituted by a conductive layer and a photoconductive layer stacked on the conductive layer is used as an image carrier. After the laminated member is uniformly charged, light is selectively irradiated on the member in accordance with an image signal to selectively decrease the resistance of the photoconductive layer, thereby selectively attenuating the charges of the uniformly charged ink. In this apparatus, the charges of the ink in ink holding regions uniformly charged are caused to indirectly leak through the photoconductive layer by irradiation. As a result, a potential difference is produced in accordance with selective irradiation.

Figure 14:
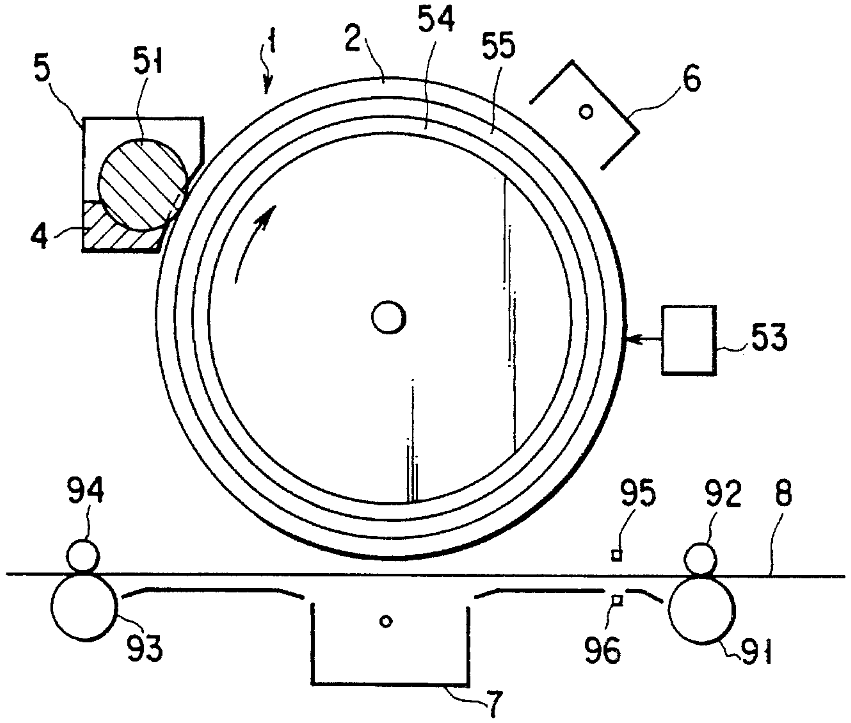
FIG. 14 is a schematic view of an image printing apparatus according to the second embodiment of the present invention.

FIG. 14 shows an apparatus according to the second embodiment of the present invention.

In this apparatus, an ink supplying section 5, a charge supplying section 52, a light-irradiating section 53, and a transfer section 7 are arranged along the outer surface of a cylindrical drum 1 having a conductive layer 54 and a photoconductive layer 55 formed on the conductive layer 54.

An operation of the apparatus will be briefly described below. Similar to the operation described with reference to FIG. 11, an ink 4 is supplied from the ink supplying section 5 to an ink holding layer 2. This ink 4 is held in regions having good ink holding properties, and reaches a first charge supplying section 601 to be uniformly charged. According to this apparatus, in the light-irradiating section 53, ink regions are selected on the basis of an image signal, and the photoconductive layer 55 is irradiated with light from the inside of the drum 1. Since the irradiated photoconductive layer 55 is reduced in resistance to become conductive, the charges held by the ink move to the conductive layer 54 through the contact portion between the ink and the photoconductive layer 55. In this manner, the charges of the ink on the irradiated photoconductive layer are removed to produce a potential difference. A latent image formed by the ink corresponding to an image signal is formed in the ink holding regions by this potential difference. The ink which has formed the latent image is moved to the transfer section 7. In the transfer section 7, the ink portions having the charges are selectively transferred to the printing medium 8. Since the ink portions from which the charges are selectively removed by the light-irradiating section 53 are not transferred, the light-irradiating section 53 is driven on the basis of an image signal representing so-called negative information, which is obtained by processing an image signal in advance.

Figure 15A:
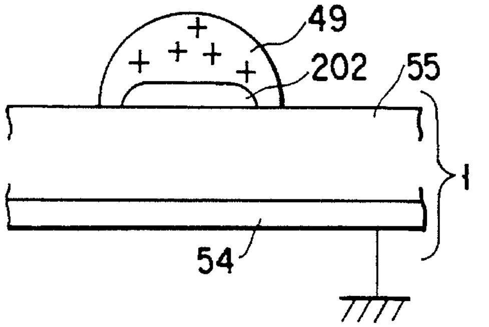
FIG. 15A to 15C are views showing an example of how a potential difference is produced by irradiation.
Figure 15B:
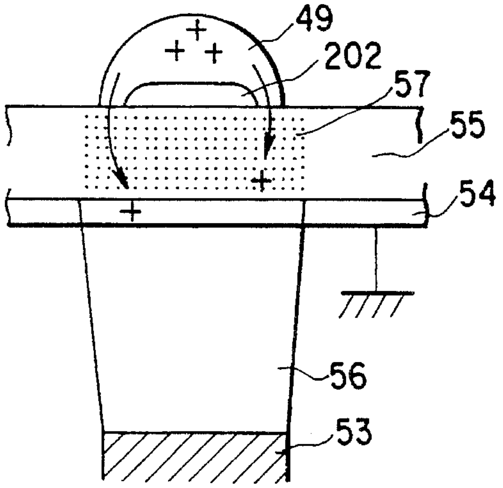
Figure 15C:
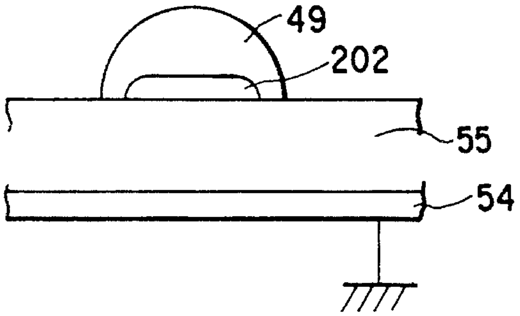

The formation of a latent image by irradiation will be further described below. FIG. 15A is a sectional view of the drum 1 to which an ink drop is attached. The photoconductive layer 55 having the conductive layer 54 is formed on the lower surface of the drum 1. Ink holding layer portions 202 having good ink holding properties are formed on the upper surface of the drum 1 to have a pattern corresponding to pixels. Ink drops 49 having charges therein are respectively held on the ink holding layer portions 202 as pattern constituent elements. A support layer (not shown) may be formed on the lower surface of the conductive layer 54. When light 56 is selectively irradiated from a light-irradiating section 53 onto the ink drop 49 shown in FIG. 15A in accordance with an image signal, an irradiated portion 57 of the photoconductive layer 55 is reduced in resistance and rendered conductive. As a result, the charge held in the ink drop 49 moves to the conductive layer 54 through the contact portion between the ink drop 49 and the photoconductive layer 55. FIG. 15B is a schematic view showing how the charge of the ink 49 moves upon irradiation. FIG. 15C shows a state in which the charge of the ink drop 49 is eliminated upon movement of the charge. When the charge of the ink drop 49 moves, as shown in FIG. 15B, the charge is eliminated from the inside of the ink drop 49, as shown in FIG. 15C. In this manner, only one ink drop which is irradiated with light loses its charge, so that an electrostatic image can be formed.

In FIG. 15B, since exposure is performed from the lower surface side of the drum 1, the conductive layer 54 need be a light-transmitting layer. When a support member is to be stacked on the lower surface of the conductive layer 54, a light-transmitting material is used for the support member.

Figure 16:
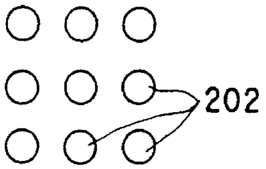
FIG. 16 is a view showing an ink holding layer used in FIGS. 15A to 15C.

As a pattern of the ink holding layer portions 202 used in FIGS. 15A to 15C, a pattern similar to those shown in FIG. 2A, FIGS. 10A, 10B or 10C is used. In this case, circular pattern constituent elements are arranged at substantially equal intervals (FIG. 16). Each circular pattern constituent element may have any size, thickness, and shape as long as it can maintain a surface tension large enough to inhibit to separate the ink drop 49 from the ink holding layer 202. The interval of the elements can be properly changed in accordance with features required for an image, e.g., resolution and sharpness. In addition, a plurality of pattern constituent elements can be caused to correspond to one dot of an image to be formed.

FIG. 17 shows a modification of the ink holding layer pattern shown in FIG. 16. The ink holding layer portions 202 shown in FIGS. 15A to 15C are formed into a dot-like pattern, as shown in FIG. 16. If an opening portion 203 is formed inside each ink holding layer, as shown in FIG. 17, the area of the contact portion between the ink drop 49 and the photoconductive layer 55 is increased, and movement of the charge upon irradiation of light can be smoothly performed. Each opening portion 203 may have any size and shape as long as it can maintain a surface tension large enough to inhibit to separate the ink drop 49 from the ink holding layer 202. In addition, a plurality of opening portions 203 may be formed in one ink holding layer 202.

Figure 19:
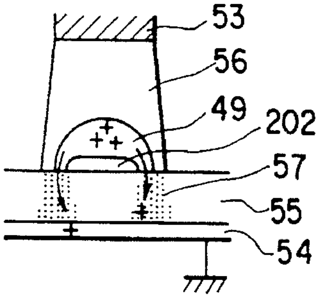
FIG. 19 is a sectional view showing still another example of how a potential difference is produced by irradiation.

FIG. 19 shows a case wherein light 56 is irradiated on the ink drop 49 on the surface of the drum 1. In this case, the conductive layer 54 formed on the lower surface of the photoconductive layer 55 may be composed of a material which does not transmit light so as not to transmit or scatter the light 56. In addition, the type of ink and the wavelength of light must be selected in advance such that the ink drop 49 transmits the incident light 56. In the case shown in FIG. 19, since the light 56 irradiated on the surface of the drum 1 reaches only a portion, of the photoconductive layer 55, which corresponds to a peripheral portion of the ink holding layer 202, the range in which the charge moves is narrowed. Especially in such a case, the pattern shown in FIG. 17 is preferable to ensure the area within which charges move.

According to the third embodiment of the present invention, there is provided an image printing apparatus comprising an image carrier, a means for forming ink holding regions, having ink holding properties different from those of the surface of the image carrier, on the image carrier in accordance with an image signal, a means for supplying an ink to the ink holding region, and a means for transferring the ink, held in the ink holding regions, to a printing medium.

Each ink holding region has good ink holding properties because it is different from the image carrier in chemical or physical properties.

Figure 20:
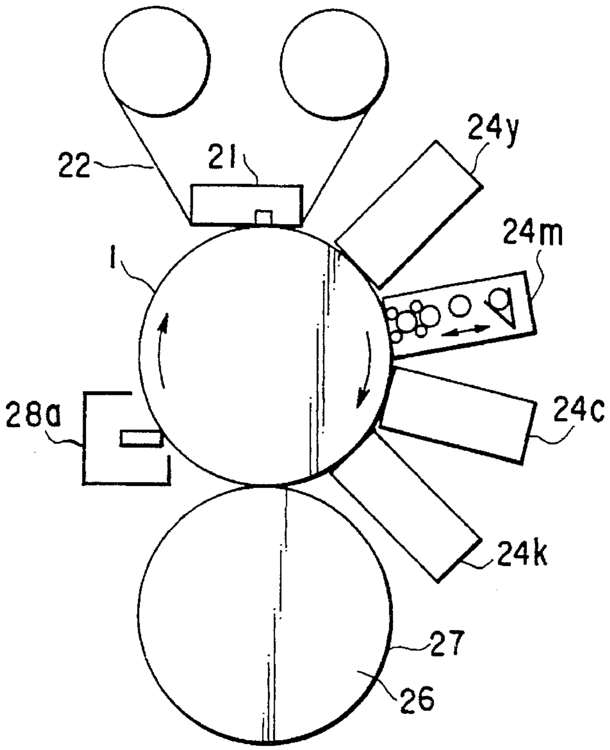
FIG. 20 is a schematic view of an apparatus according to the third embodiment of the present invention.

FIG. 20 shows an apparatus according to the third embodiment of the present invention.

As shown in FIG. 20, this apparatus includes an image carrier 1, and the following components sequentially arranged along the surface of the image carrier 1: a thermal printing head 21, inking units 24*y*, 24*m*, 24*c*, and 24*k* respectively containing yellow, magenta, cyan, and black inks, a platen 26, and a cleaning member 28a.

Figure 21:
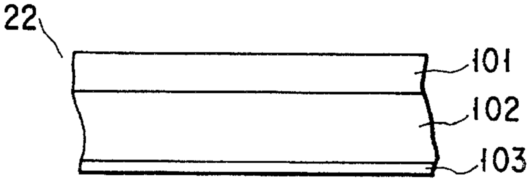
FIG. 21 is a sectional view showing the structure of a transfer sheet used in the apparatus in FIG. 20.

In the apparatus, a transfer sheet 22 is heated by the thermal printing head 21 in accordance with an image signal. FIG. 21 shows the structure of the transfer sheet 22. As shown in FIG. 21, the transfer sheet 22 is constituted by a heat-resistant layer 103, a base layer 102, and a hot-melt transfer layer 101 which are sequentially stacked on each other. For example, PET (polyethylene telephthalate) is used for the base layer 102; and a resin-based binder, for the hot-melt transfer layer 101. The thermal printing head 21 is pressed against the transfer sheet 22 from its base layer side, and is pressed against the image carrier 1, covered with silicone rubber, through the hot-melt transfer layer 101. The thermal printing head 21 is controlled in accordance with an image signal to melt/transfer the hot-melt transfer layer 101 onto the image carrier 1, thereby forming an image from the hot-melt transfer layer 101.

Figure 22:
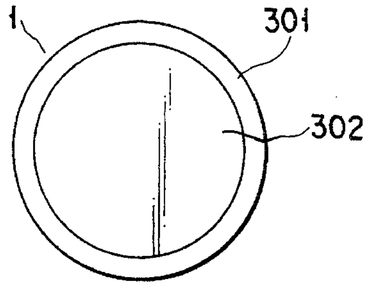
FIG. 22 is a sectional view showing the structure of an image carrier used in the apparatus in FIG. 20.

FIG. 22 shows the arrangement of the image carrier 1. As shown in FIG. 22, the image carrier 1 is constituted by a core roller 302 and a silicone rubber layer 301 formed thereon. The core roller 302 may be hollow. The image carrier 1 and the hot-melt ink holding layer 101 have different affinities for an ink, so that the image carrier 1 on which an image is formed exhibits the same characteristics as those of a lithography for printing. More specifically, when an thin ink film on a roller is pressed against the plate on the image carrier 1, the ink is attached to only the transferred image line portions because of the ink repellency of the silicone rubber layer on the image carrier 1. By transfering the obtained ink image onto a printing sheet 27, printing in a printing ink can be performed. In this scheme, since no dampening water is used, printing paper is not easily extended even if direct printing is performed.

A printing method using a plate formed on the image carrier 1 will be described next.

The silicone rubber layer on the image carrier 1 exhibits ink repellency, whereas the ink holding layer (binder) of the transfer sheet exhibits ink affinity. For this reason, the image carrier on which the binder is transferred can be used as a lithography (without water).

The image carrier 1 on which the plate is formed is coated with an yellow ink by the inking unit 24*y* to form an ink image. This mechanism is basically the same as an inking mechanism in lithographic printing. By the time the ink is supplied from the ink fountain roller to the form roller through a plurality of rollers, the ink will be formed into a uniform thin layer. Although the inking units are arranged for four colors, only a unit corresponding to a color ink to be applied is brought into contact with the image carrier.

The inked plate is pressed against the printing sheet 27 chucked by the platen 26 to transfer the ink image to the printing sheet 27.

After the ink image is transferred, the image carrier 1 is cleaned to restore their initial states. Cleaning units 28*a* and 28*b* are constituted by blades. If cleaning cannot be satisfactorily performed by the blades, a wiping-off roller composed of cloth or the like may be added.

The printing sheet 27 is rotated to the initial position while it is chucked by the platen 26. When the ink image is dried to a certain degree, printing of the next color is performed.

When the temperature of the plate surface of a lithography without water increases, fog is caused. For this reason, the apparatus preferably includes a unit for controlling the temperature of the plate surface within a proper range. In general, a cooling rod or a fan is used for a cooling operation. Although not shown, the fan is used to not only cool the plate surface but also dry the printing sheet to which the ink image is transferred.

The above-described operation is repeated four times to sequentially stack yellow, magenta, cyan, and black ink images on the printing sheet 27, thus performing color printing.

Figure 23:
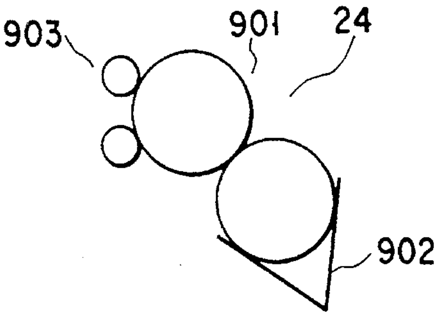
FIG. 23 is a schematic view of an inking unit used in the apparatus according to the third embodiment of the present invention.

Note that the number of rollers constituting an inking portion 29 for a plate may be decreased, as shown in FIG. 23. In this case, an ink fountain roller 901 guides ink from an ink fountain 902 and applies the ink to a plate formed by two form rollers 903. In this scheme, an ink tends to be nonuniformly coated because the number of rollers is smaller than that of a general inking unit. In such a case, the inking unit may be caused to idle before ink coating while it is separated from a plate and the ink fountain, and coating is started after the ink film becomes uniform. In addition, the image carrier may be rotated many times while the form roller 903 is in contact with the plate. Note that the inking units for the four colors may be sequentially rotated. In this case, although not shown, the four inking units are rigid-coupled to each other, or rotatably coupled to each other in the form of a Ferris wheel. In the former scheme, the driving mechanism is simplified, but a structure for preventing leakage of an ink upon rotation of the inking units is required.

Figure 24:
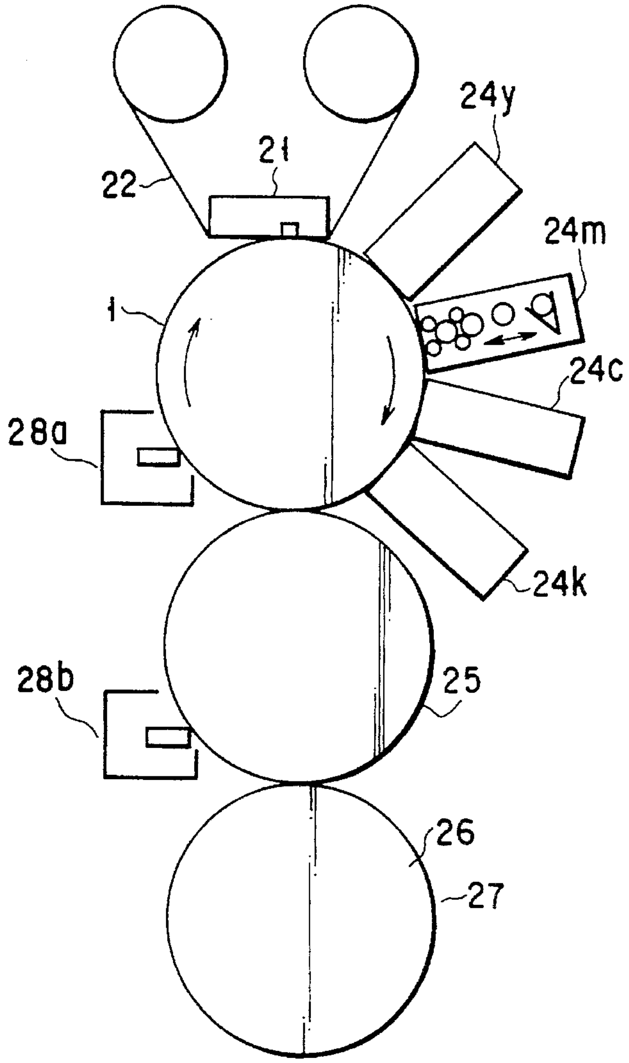
FIG. 24 iS a schematic view of a modification of the apparatus according to the third embodiment of the present invention.

As shown in FIG. 24, the blanket 25 may be interposed between an image carrier 1 and the platen 26.

In this arrangement, after an obtained ink image is temporarily transferred to the blanket 25, the image can be transferred to a printing sheet.

In the present invention, the transfer amount of a transfer layer can be area-modulated by performing pulse-width modulation of a driving pulse for the thermal printing head 21.

The reasons why the printing apparatus of the present invention can form (transfer) an image having better tone characteristics and higher image quality than those of an image obtained by a general melt transfer scheme will be described below.

In general, tone expressing performance is in inverse proportion to noise level. For this reason, in the melt transfer scheme, even if printing energy is finely controlled by pulse width modulation, separation noise of an ink layer or noise produced in transferring the ink onto a printing sheet is large. In addition, blurring of a thermal latent image is caused by thermal diffusion.

In contrast to this, the printing apparatus of the present invention can perform area modulation with high image quality because it is different from the normal melt transfer scheme in the following points.

In the general thermal transfer scheme, an ink transferred to a printing sheet must absorb visible light. Although the maximum visible light wavelength is about 750 nm, an ink needs to have a thickness of about 1.5 μm provided that the safety margin is set to be 2 in consideration of individual differences and reliability. In contrast to this, according to the present invention, since an ink holding layer is transferred to an image carrier instead of an ink itself, the thickness of the layer can be set to be smaller than 1.5 μm. The thickness of the ink holding layer can be reduced to a value enough to maintain the physical properties of the surface of the ink holding layer.

Separation noise is produced when a molten ink portion is separated from a surrounding non-melted portion. If an ink layer is reduced in thickness, although the separation force is decreased to reduce the noise, an increase in printing density cannot be achieved. For this reason, the thickness of the ink layer is generally set to be 2 μm or more. In the apparatus of the present invention, since a transferred binder is used for only the image line portions of a lithography, the ink layer need not be increased in thickness. Therefore, separation noise can be suppressed by setting the transfer layer consisting of the binder to be 1.2 μm or less.

If area modulation of 64 tone levels is to be performed at a rate of 12 lines/mm (about 300 dpi), one side of a minimum tone pixel has a size of (1,000/12)/8 μm=10.4 μm, i.e., $10.4^2$ $\mu m^2$. Since a fluctuation (area in this case) is preferably set to be equal to or less than ½ that of the minimum tone level, the pixel size error is preferably $(10.4^{2\times1.5})^{1/2}-10.4$ μm=2.34 μm or less. Although the range of diffusion separation of the transfer layer is not constant, the range is regarded to be almost equal to the thickness of a transfer sheet. Since errors are caused at both sides (upper and lower sides or left and right sides) of a pixel, the thickness of a transfer layer is set to be 2.34/2 μm=1.17 μm, and preferably about 1.2 μm or less. In practice, it is more preferable that the thickness be set to 0.1 to 1.2 μm.

Transfer noise is mainly caused by the low surface smoothness of a printing medium. Since the surface of a thermal transfer sheet has projections having a size of about 10 μm, portions of the transferred ink float from the printing sheet. In the printing apparatus of the present invention, however, since the ink is transferred to a silicone rubber sheet having high surface smoothness, almost no floating of the ink occurs, resulting in a reduction in transfer noise.

Figure 25:
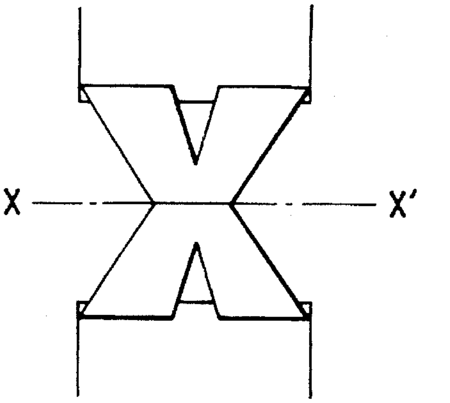
FIG. 25 PRIOR ART
FIG. 25 is a view showing a thermal printing head used in the present invention.
Figure 26:
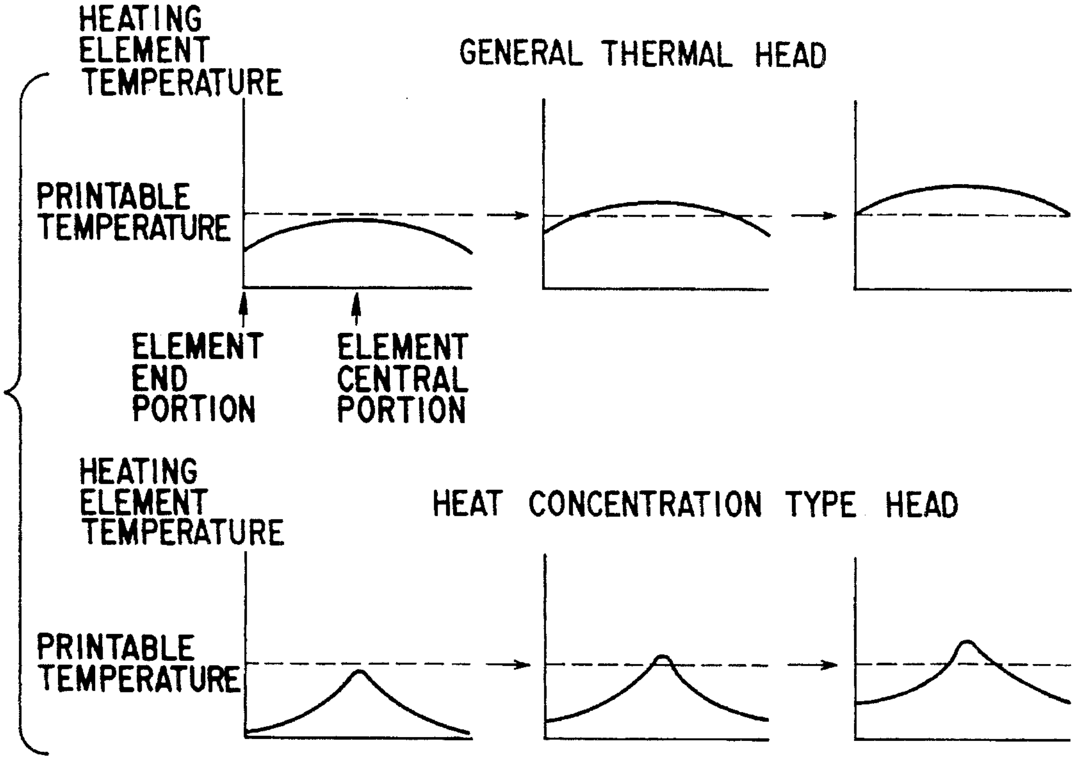
FIG. 26 is a graph showing heat distributions at a cross-section X–X' in FIG. 25.

As the thermal printing head, a heat concentration type thermal printing head such as the one shown in FIG. 25 is used. FIG. 26 is a graph representing a heat distribution at a cross-section X–X' in FIG. 25. As shown in FIG. 26, since the heat concentration type thermal printing head has a steep heat distribution curve, the transferable temperature range gradually broadens in accordance with the width of a driving pulse, facilitating area modulation. Note that as the thermal printing head, in addition to the heat concentration type thermal printing head, a partial graze type thermal printing head and the like can be used.

As described above, in the printing apparatus of the present invention, more stable multi-tone printing can be performed by properly modifying a transfer sheet or a thermal printing head.

In addition, since the transfer layer of a transfer sheet used in the printing apparatus of the present invention requires no pigment, coating need not be performed for each color, and the transfer sheet may be thin as described above. For this reason, the transfer sheet can be reduced in cost as compared with a general color ribbon used for the melt transfer scheme.

As materials used for an image carrier surface, in addition to silicone, Teflon and the like may be used. In addition, as materials for an ink holding region, carnauba wax, paraffin wax, polystyrene, and the like may be used.

An apparatus according to the fourth embodiment of the present invention will be described next.

According to the fourth embodiment of the present invention, there is provided an image printing apparatus comprising an image carrier essentially constituted by a base layer and a hot-melt resin layer formed on the base layer and having ink holding properties different from those of the base layer, a means, arranged on the base layer, for selectively heating the hot-melt resin layer through the base layer in accordance with an image signal, a member, arranged on the hot-melt resin layer, for transferring and removing the heated hot-melt resin, a means for supplying an ink to ink holding regions formed by selectively removing the hot-melt resin layer, and a means for transferring the supplied ink to a transfer medium.

In the fourth embodiment of the present invention, the hot-melt ink holding layer of a transfer sheet is selectively heated in accordance with an image signal and is transferred to a transfer removal roller to be removed, and a plate is formed by using hot-melt transfer layer portions left on the transfer sheet. Recording is performed by using this plate. This apparatus will be described in detail below.

Figure 27:
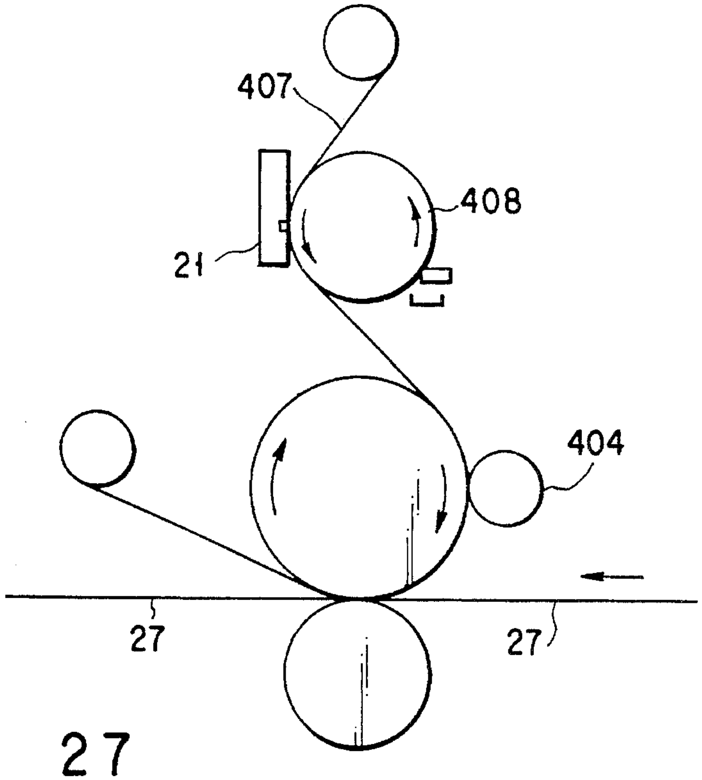
FIG. 27 is a schematic view of an apparatus according to the fourth embodiment of the present invention.
Figure 28:
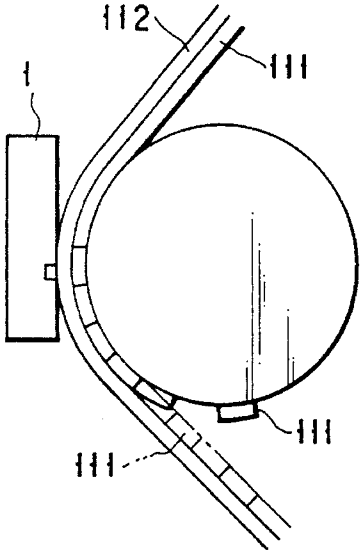
FIG. 28 is a schematic view showing part of the operation of the apparatus in FIG. 27.
Figure 29:
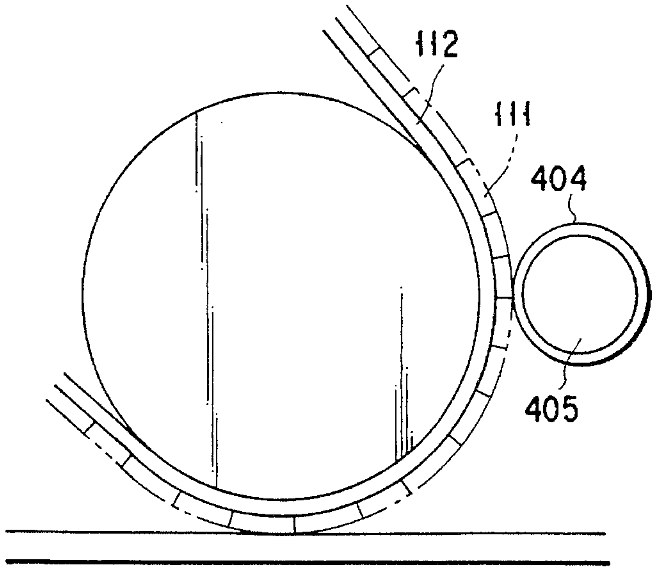
FIG. 29 is a schematic view showing another part of the operation of the apparatus in FIG. 27.

FIG. 27 is a schematic view showing an apparatus according to the fourth embodiment of the present invention. A transfer sheet 407 is heated by a thermal printing head 21 to melt/transfer a hot-melt resin layer having good ink holding properties from the sheet to a transfer removal roller 408, thus forming an image. FIG. 28 shows a state wherein a hot-melt transfer layer 111 is transferred to the transfer removal roller 408. As shown in FIG. 28, a transfer sheet used in this embodiment is constituted by a base layer 112 and transfer layer 111 which are sequentially stacked. A silicone rubber material and a resin-based binder are respectively used for the base layer 112 and the transfer layer 111. With this arrangement, since the silicone rubber layer appears at a portion, of the transfer sheet, from which the ink holding layer is transferred, the portion exhibits ink repellency. The ink holding layer exhibits ink affinity, and the transfer sheet exhibits the same characteristics as those of a lithography accordingly. The transfer sheet from which the transfer layer 111 is selectively removed by the transfer removal roller 408 is then brought into contact with an ink roller 404 having an ink layer formed thereon. As a result, ink is held on the transfer layer 111. FIG. 29 shows this state. As shown in FIG. 29, the ink is held by only the transfer layer having ink affinity. By transferring the ink to a printing medium, image printing is performed. As described above, in this embodiment, since a portion, of a transfer sheet, from which a ink holding layer is transferred to the transfer removal roller 408 is not printed, a non-image line portion can be printed in accordance with an image signal. Note that a heat-resistant layer 103 (not shown) may be optionally formed on the base layer 112.

Similar to the third embodiment, each dot may be area-modulated by performing pulse width modulation of a driving pulse for the thermal printing head.

Figure 30:
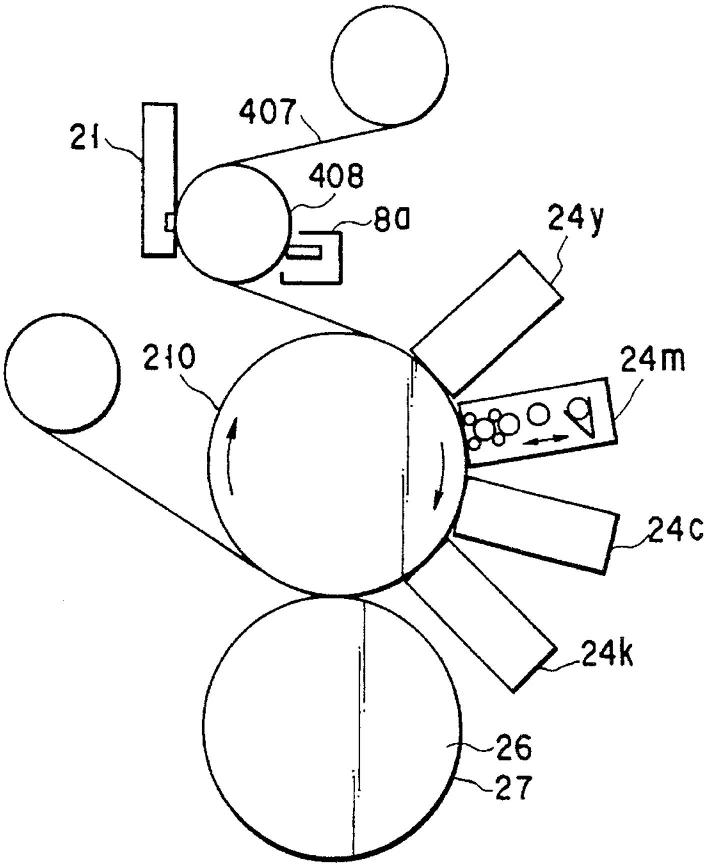
FIG. 30 is a schematic view of a color image forming apparatus according to the fourth embodiment of the present invention.

A color image can be printed by using four inking units instead of the ink roller 404. FIG. 30 shows a color image forming apparatus according to the fourth embodiment of the present invention. As shown in FIG. 30, a plate formed on a transfer sheet 407 is wound around a drum 210 to be used as a lithography (without water) as in the third embodiment. An transfer layer transferred to a transfer removal roller 408 is not necessary-and hence is removed by a blade.

A yellow ink is coated on the plate wound around the drum 210 by an inking unit 24y.

A printing sheet 27 chucked by a platen 26 is pressed against the ink-coated plate to transfer an ink image to the printing sheet 27.

When the plate is taken up by a necessary amount, the initial state is restored. The plate need not be cleaned. The printing sheet 27 is rotated to its initial position while it is chucked by the platen 26.

The above-described operation is repeated four times to sequentially stack yellow, magenta, cyan, and black ink images on the printing sheet 27, thus performing color printing.

Similar to the apparatus of the third embodiment, the inking portion of this apparatus can also be simplified.

Similar to the third embodiment, an ink image can be transferred to a blanket by pressing the blanket against the drum 210 through the sheet 407. After the transfer of the ink image, the blanket is cleaned by the blade to restore the initial state.

Even if the base layer and the transfer layer respectively exhibit ink affinity and ink repellency, printing can be performed in the same manner as described above.

In the apparatus according to each of the third and fourth embodiments of the present invention, ink holding regions are formed on an image carrier in accordance with an image signal. Such an image carrier can be used in the same manner as a plate for printing. A printing ink is applied to this plate to perform image printing.

The thin transfer layer on a plate formed by the melt transfer scheme is transferred to a medium having a good surface condition so that an image having quality higher than that obtained by a general melt transfer printing scheme can be formed at a low running cost. In addition, since lithographic printing using a printing ink can be performed by using this plate, an image which looks as solid as that obtained by printing can be obtained.

According to the fifth embodiment of the present invention, there is provided an image printing apparatus comprising an image carrier essentially constituted by a conductive member or a dielectric member, a transfer sheet essentially constituted by a base layer and an image holding layer consisting of a hot-melt dielectric material having a conductivity lower than that of the image carrier and formed on the base layer so as to be brought into contact with the image carrier, a means, arranged on the base layer, for heating the hot-melt dielectric layer through the base layer in accordance with an image signal, thereby forming image holding regions, a means for supplying charges onto the image carrier, on which the image holding regions are formed, so as to form an electrostatic latent image in the image holding regions, and a means for developing the electrostatic latent image.

In this apparatus, the image is transferred by using a reference of capacity due to forming a dielectric layer on the image carrier. For this reason, they differ in physical properties, i.e., dielectric constant and resistance.

Figure 31:
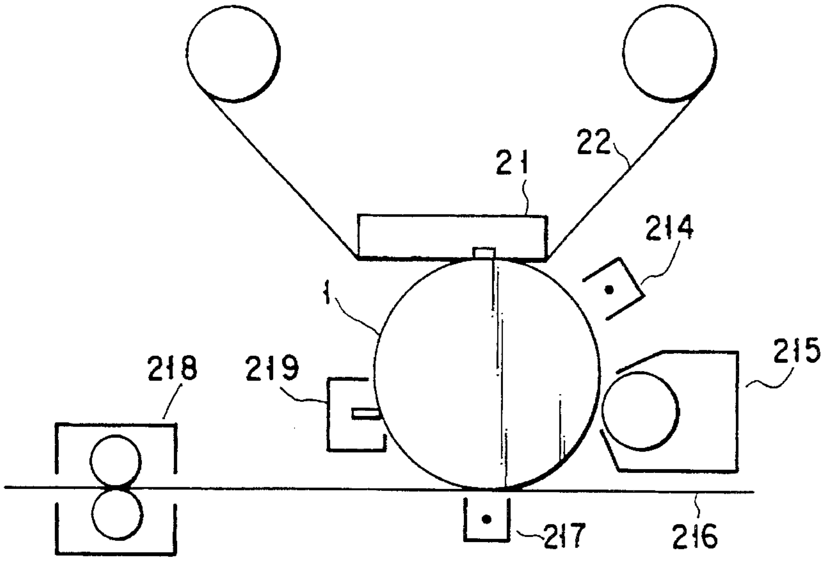
FIG. 31 is a schematic view of an apparatus according to the fifth embodiment of the present invention.

FIG. 31 is a schematic view showing an apparatus according to the fifth embodiment of the present invention.

In this apparatus, a transfer sheet having an image holding layer consisting of a dielectric material and formed, as a transfer layer, on a base layer is used, and the image holding layer consisting of the dielectric material is transferred to a conductive image carrier. An electrostatic latent image is formed on the image carrier by supplying charges to the transferred image holding layer. The obtained electrostatic latent image is printed by an electrophotographic process. This apparatus will be described in detail below.

Figure 32:
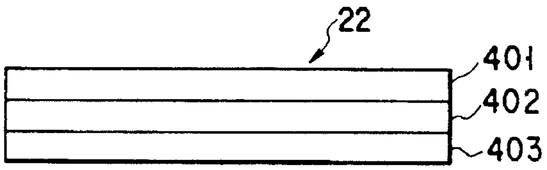
FIG. 32 is a sectional view showing the arrangement of a transfer sheet used in the apparatus in FIG. 31.

As shown in FIG. 31, a transfer sheet 22 is heated by a thermal printing head 21 arranged on the image carrier 1 in accordance with an image signal to melt/transfer the image holding layer to the image carrier 1 consisting of a conductive material such as aluminum, thereby forming an image. FIG. 32 is a sectional view of the transfer sheet 22 used in the present invention. As shown in FIG. 32, the image carrier 1 is constituted by a laminated structure including a heat-resistant layer 401, a base layer 402, and an image holding layer 403. PET and a resin-based binder are respectively used for the base layer and the transfer layer. The image carrier 1 is grounded. The image holding layer consists of a dielectric material. That is, a dielectric image is formed on a conductor. Note that as dielectric materials, for example, carnauba wax, paraffin wax, and polystyrene can be used.

After the transfer of the transfer layer, charges are supplied to the image carrier 1 by a charger 214 arranged on the image carrier 1. At this time, the charges are held on the dielectric member but are not held on the conductive portion. For this reason, an electrostatic latent image is formed in accordance with the transferred image. When the formed latent image is developed at a proper bias voltage by using a developing unit 215, a toner image is formed on the latent image. In this embodiment, a noncontact developing method (jumping developing method) using a one-component toner is employed. This method can be performed by applying a DC bias and an AC bias between the developing sleeve and the image carrier. The jumping developing method is used to prevent short-circuiting between the developing sleeve and the image carrier and achieve a reduction in size of the apparatus. Magnetic brush developing may be used for development. In this case, however, in order to prevent short-circuiting between the developing sleeve and the image carrier through a carrier, the carrier to be used may be coated with an insulating film. In either method, the developing sleeve and the conductive portion of the image carrier must be electrically insulated from each other.

The toner image formed on the image carrier 1 is electrostatically transferred to a printing sheet 216 by supplying charges from the rear surface side of the printing sheet 216 by a transfer charger 217. The toner on the printing sheet 216 is thermally fixed by a fixing unit 218 constituted by a heat roller, thus completing the printing operation. After the image carrier 1 passes the transfer section, the transfer medium and the toner are cleaned by a cleaning unit 219 constituted by a blade, thus restoring the initial state. In this apparatus, a drum-like member is used as an image carrier. However, the present invention is not limited to this. For example, an image carrier in the form of an endless belt may be used.

In addition, an insulating member may be formed on the surface of the image carrier. With this arrangement, since no short-circuiting occurs between the image carrier and the developing sleeve, various developing methods can be used.

A state in which charges supplied to the image carrier by a charger in the apparatus will be considered below.

Figure 33A:
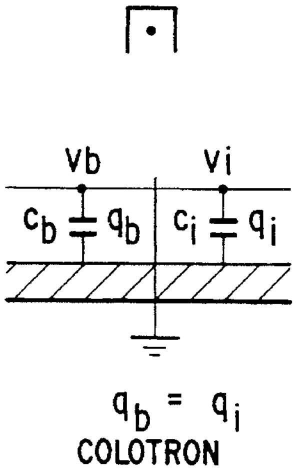
FIGS. 33A and 33B are views showing chargers used in the apparatus in FIG. 31.

Assume that the capacitance of the image carrier surface per unit area is represented by cl; and that of the transfer layer, by c2. A capacitance cd of a non-transfer portion is cl, and a capacitance ci of a transfer portion is given by $ci=cl\cdot c2/(cl+c2)$ If the capacitance c2 is set to be about cl/10, $ci=c2=cd/10$ The apparatus shown in FIG. 31 uses a corotron as a charger 214. FIG. 33A shows the surface potentials of a transfer portion and a non-transfer portion in a case wherein charges are supplied from this corotron. Since the corotron supplies almost uniform charges q, v=q/c, and the relationship between surface potentials vi and vb of a transfer portion and a non-transfer portion is represented by the following equation:

$vi=10\cdot vb$

Therefore, sufficient contrast can be obtained.

Figure 33B:
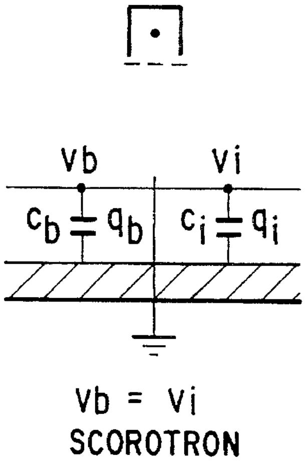

Although the corortone is used in the arrangement shown in FIG. 31, charges may be supplied from a scorotron. FIG. 33B shows the surface potentials of a transfer portion and a non-transfer portion in a case wherein charges are supplied from this scorotron. In this case, the surface potentials become almost uniform.

At this time, charges qi and qb respectively stored in the transfer portion and the non-transfer portion are represented by $qi=qb/10$ Therefore, sufficient contrast can be obtained from the viewpoint of charge amounts. Which system is to be used to supply charges may be determined depending on development conditions.

According to the sixth embodiment of the present invention, there is provided an image printing apparatus comprising an image carrier having a first electrode layer, a pressure switching layer formed on the first electrode layer, a heating resistive layer formed on the switching layer, and a second electrode layer formed on the heating resistive layer, a transfer sheet essentially constituted by a base layer and an image holding layer consisting of a hot-melt dielectric material and formed on the base layer so as to be brought into contact with the image carrier, a means, arranged on the base layer of the transfer sheet, for heating the hotmelt dielectric layer through the base layer in accordance with an image signal so as to transfer the dielectric layer to the image carrier, thereby forming image holding regions, a means for supplying charges onto the image carrier, on which the image holding layer is formed, so as to form an electrostatic latent image in the image holding regions, and a means for developing the electrostatic latent image by using a developing agent, wherein the image carrier on which the image is developed by using the developing agent is partially pressed against a printing medium, and a voltage is applied between the first and second electrodes to cause a current to flow to a region, of the switching layer, on which a pressure is applied, so as to generate Joule heat, thereby fixing the non-fixed developing agent on the printing medium by using the Joule heat.

An apparatus according to the sixth embodiment of the present invention will be described below. This apparatus has a heating means inside an image carrier to simultaneously perform transfer and fixing operations by heat.

Figure 34:
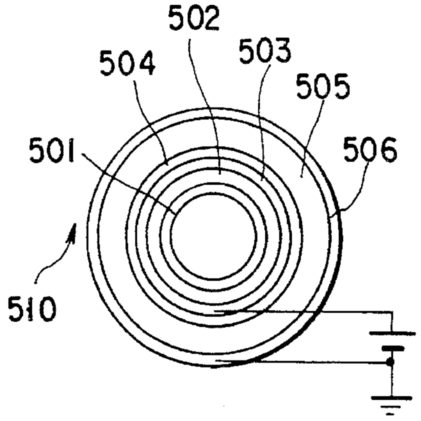
FIG. 34 is a sectional view showing the structure of an image carrier used in an apparatus according to the sixth embodiment of the present invention.

FIG. 34 shows the arrangement of an image carrier 510 used in the apparatus. The image carrier 510 has a core roller 501, an insulating layer 502, a first electrode layer 503, a switching layer 504, a heating resistive layer 505, and a second electrode layer 506 which are sequentially formed from the inside. The core roller 501 and the heating resistive layer 502 may be constituted by one common member. The first electrode layer 503 is connected to a power source for a fixing operation. The second electrode layer 506 is grounded. The switching layer 504 serves to render the electrodes conductive at only portions which are pressed against a printing sheet. In this case, a pressure sensitive conductive rubber material is used for the layer 504.

Figure 35A:
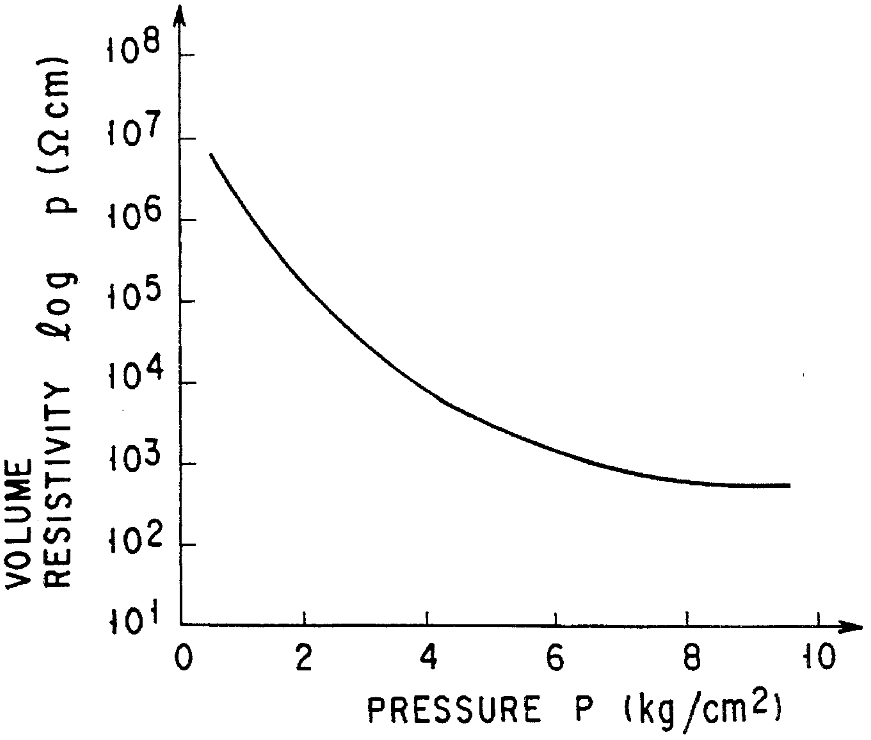
FIG. 35A is a graph showing the characteristics of a pressure sensitive conductive rubber material used in the apparatus according to the sixth embodiment of the present invention.
Figure 35B:
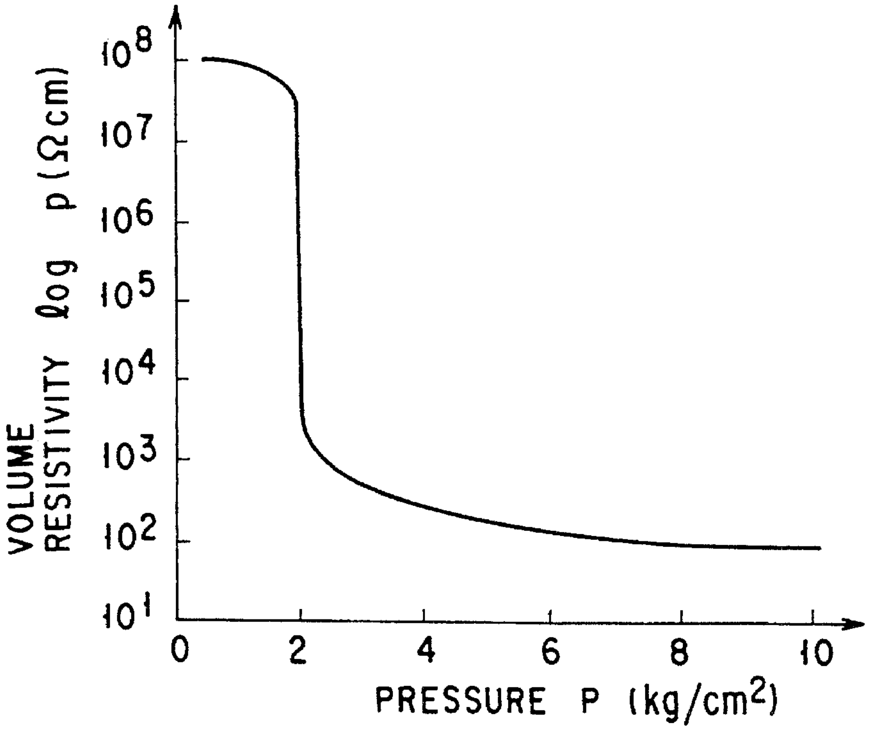
FIG. 35B is a graph showing the characteristics of another pressure sensitive conductive rubber material used in the apparatus according to the sixth embodiment of the present invention.

As pressure sensitive conductive rubber materials, a rubber material based on load/resistance characteristics which represents a gently sloping such as the one shown in FIG. 35A and a rubber material based on load/resistance characteristics which represents a steep slopping depending on small mechanical contacts as shown in FIG. 35B are available. A conductive silicone rubber material is used for the heating resistive layer 505. A conductive silicone rubber material or a pressure sensitive conductive rubber material having load/resistance characteristics is obtained by dispersing, for example, a nickel or carbon powder, as a filler, in silicone rubber. An arbitrary resistance can be obtained in accordance with the amount of filler. An offset preventing layer such as a Teflon layer may be formed on the surface of the second electrode layer 506. This layer serves to prevent an transfer layer and the like from being left on the image carrier upon transfer of a toner image.

With this arrangement, a transfer charger or a fixing unit and a cleaning unit can be omitted, and a reduction in size and cost of the apparatus can be realized.

Figure 36:
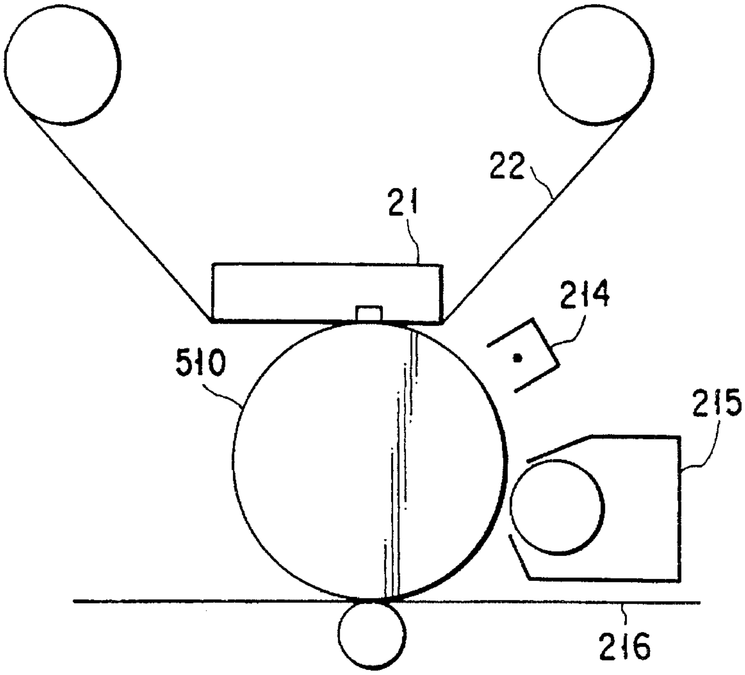
FIG. 36 is a schematic view of an apparatus according to the sixth embodiment of the present invention.

An overall operation of the apparatus will be described next. FIG. 36 is a schematic view showing the overall arrangement of the apparatus according to the sixth embodiment of the present invention. This apparatus has almost the same arrangement as that of the apparatus shown in FIG. 31 except that it uses the image carrier 510 shown in FIG. 34, but does not use any cleaning unit, transfer charger, or fixing unit. First, a transfer sheet 22 is heated by a thermal printing head 21 to transfer a transfer layer onto the image carrier 510 in accordance with an image signal. Charges are then supplied from a charger 214 to the image carrier 510 to obtain a toner image upon development. When the image carrier 510 is pressed against a printing sheet, the switching layer 504 in the image carrier 510 is set in an ON state. As a result, a current flows to the heating resistive layer 505 at a peripheral portion to generate Joule heat. By using this Joule heat, the toner and the transfer layer on the image carrier 510 are melted/transferred (fixed) onto a printing sheet 216. If the release characteristics of the surface of the image carrier 510 are improved, and an optimal heating temperature is set, no toner and image holding layer are left on the image carrier 510, and no cleaning unit is required.

Figure 37:
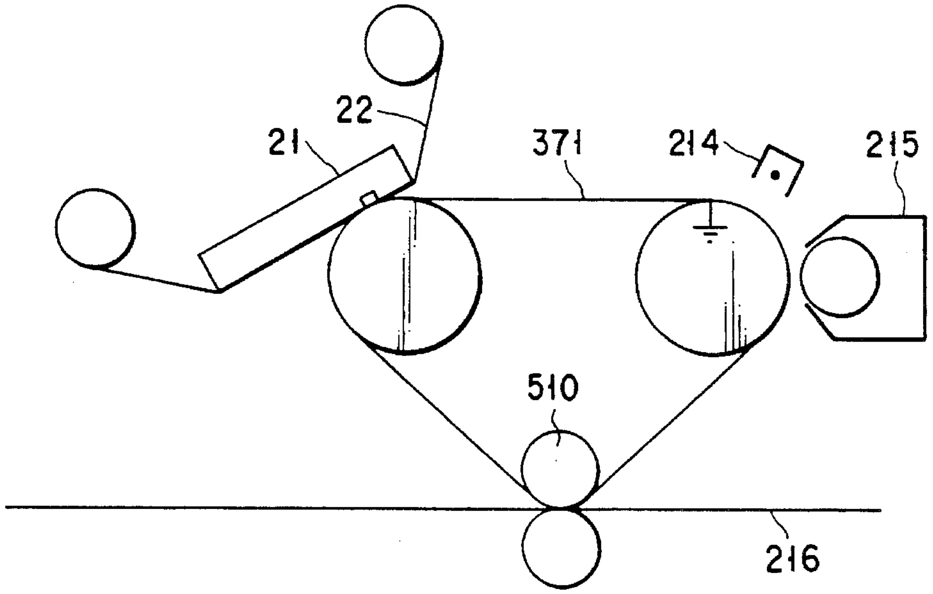
FIG. 37 is a schematic view of a modification of the apparatus according to the sixth embodiment of the present invention.

FIG. 37 shows a modification of the apparatus according to the sixth embodiment of the present invention. As shown in FIG. 37, in place of the image carrier 510, a combination of a transfer roller constituted by a core roller 501, a heat-resistant layer 502, a first electrode layer 503, and a heating resistive layer 505, and an endless belt 371 constituted by a second electrode layer 506 may be used.

In this case, if the second electrode layer on the surface of the image carrier 371 and the heating resistive layer of the transfer roller are brought into contact with each other at only a pressed portion of a printing sheet, the switching layer 504 can be omitted.

In each of the fifth and sixth embodiments of the present invention, an electrostatic latent image is formed when a negative capacitance is applied during on a dielectric layer formed on an image carrier.

With this arrangement, a photosensitive member, a laser scan unit, and a charge-removal lamp need not be used, realizing a reduction in size and weight and also a reduction in cost. By arranging a heating means inside a medium, a fixing unit and a transfer charger can also be omitted. Furthermore, a cleaner can be omitted by optimizing the arrangement.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image forming apparatus, comprising:

an image carrier layer having colorant holding regions and a colorant repelling region formed on a surface, said colorant holding regions being capable of attracting a colorant in a liquid state and separately holding the colorant as pixels, and said colorant repelling region having poor liquid colorant holding properties compared with the colorant holding regions;

means for supplying a colorant in a liquid state to the image carrier layer so as to separately hold the colorant as pixels in the colorant holding regions;

means for selectively producing a potential difference in the colorant held in the colorant holding regions in accordance with an image signal, thereby forming a latent image in the colorant holding regions; and means for transferring the colorant corresponding to the latent image onto a printing medium.

2. An apparatus according to claim 1, wherein said image carrier has a shape selected from the group consisting of shapes of a roller, an endless belt, and a take-up sheet.

3. An apparatus according to claim 1, wherein the image carrier are composed of at least one material selected from the group consisting of polyethylene terephthalate, polytetrafluoroethylene, polyimide, silicone resin, and polycarbonate.

4. An apparatus according to claim 1, wherein a pattern of said colorant holding regions is formed by means selected from the group consisting of heating means, light irradiating means, vacuum deposition means, electrolytic plating means, electroless plating means, and mold release agent coating means.

5. An apparatus according to claim 1, wherein the potential difference is at least a difference selected from the group consisting of an electric potential difference based on electric energy, a temperature difference based on thermal energy, and a molecular bonding force based on chemical energy.

6. An apparatus according to claim 1, wherein a pattern of said colorant holding regions has constituent elements selected from the group consisting of circular, polygonal, and doughnut-like shapes which are obtained by substantially regularly arranging the colorant holding regions at predetermined intervals.

7. An apparatus according to claim 1, wherein said colorant holding regions include a pattern corresponding to one pixel.

8. An apparatus according to claim 1, wherein said means for producing the potential difference is an electric potential difference producing means.

9. An apparatus according to claim 8, wherein said electric potential difference producing means comprises charge supplying means.

10. An apparatus according to claim 8, wherein said electric potential difference producing means includes means for producing potential differences in multiple stages in accordance with levels of an image signal.

11. An apparatus according to claim 1, wherein said image carrier has a conductive layer and a photoconductive layer stacked on the conductive layer, said apparatus further comprising means, arranged between said means for supplying the colorant and said means for selectively producing a potential difference, for substantially uniformly supplying charges to the colorant, and said means for selectively producing a potential difference comprises irradiation means for irradiating light on the photoconductive layer in accordance with an image signal so as to selectively attenuate the charges in the colorant by decreasing the resistance of the photoconductive layer, thereby forming a latent image in the colorant holding regions on the basis of a potential difference in the colorant.

12. An apparatus according to claim 11, wherein said irradiation means is arranged on a colorant side of the photoconductive layer.

13. An apparatus according to claim 11, wherein said irradiation means is arranged on a conductive layer side of the photoconductive layer.

14. An image forming apparatus, comprising:

a transfer sheet essentially constituted by a base layer and a hot melting material layer formed on the base layer and having good ink holding properties;

an image carrier arranged to face said hot melting material layer and having a surface which is poor in ink holding properties and repels an ink, the hot melting material being capable of attachment to said surface of the image carrier;

heat transfer means arranged to face said image carrier with said transfer sheet positioned to extend therebetween such that said base layer of the transfer sheet faces said heat transfer means, the base layer being selectively heated by the heat transfer means, with the hot melting material layer kept in contact with the image carrier, in accordance with an image signal so as to transfer the hot melting material onto the image carrier;

ink supply means for supplying an ink to an entire surface of said image carrier to allow said ink to be adhered to said hot melting material layer so as to form an ink image on said image carrier; and transfer means for transferring said ink image onto a printing medium.

15. An image forming apparatus, comprising:

a transfer sheet essentially constituted by a base layer and a hot melting material layer formed on the base layer and having poor ink holding properties to repel an ink;

an image carrier arranged to face said hot melting material layer and having a surface exhibiting good ink holding properties, the hot melting material being capable of attachment to said surface of the image carrier;

heat transfer means arranged to face said image carrier with said transfer sheet positioned to extend therebetween such that said base layer of the transfer sheet faces said heat transfer means, the base layer being selectively heated by the heat transfer means, with the hot melting material layer kept in contact with the image carrier, in accordance with an image signal so as to transfer the hot melting material onto the image carrier;

ink supply means for supplying an ink to an entire surface of said image carrier to allow said ink to be adhered to the surface of said image carrier except the regions to which said hot melting material has been transferred so as to form an ink image of the image carrier; and transfer means for transferring said ink image onto a printing medium.

16. An image forming apparatus, comprising:

an image carrier sheet essentially constituted by a base layer having poor ink holding properties to repel an ink and a hot melting material layer formed on the base layer and having good ink holding properties;

heat removal means for selectively heating said hot melting material layer in accordance with an image signal so as to remove a heated hot melting material layer from said image carrier sheet to expose said base layer;

ink supply means for supplying an ink to an entire surface of said image carrier sheet to allow the ink to be adhered to said hot melting material so as to form an ink image on the image carrier sheet; and transfer means for transferring said ink image onto a printing medium.

17. An image forming apparatus, comprising:

an image carrier sheet essentially constituted by a base layer having good ink holding properties and a hot melting material layer formed on the base layer and having poor ink holding properties to repel an ink;

heat removal means for selectively heating said hot melting material layer in accordance with an image signal so as to remove a heated hot melting material layer from said image carrier sheet to expose said base layer;

ink supply means for supplying an ink to an entire surface of said image carrier sheet to allow the ink to be adhered to the exposed base layer of said image carrier sheet so as to form an ink image on the image carrier sheet; and transfer means for transferring said ink image onto a printing medium.

18. An image forming apparatus, comprising:

an image carrier including a first electrode layer, a pressure switching layer formed on the first electrode layer, a heating resistive layer formed on the pressure switching layer, and a second electrode layer formed on the heating resistive layer;

means for selectively forming a developing agent holding layer composed of a hot melt material having a lower conductivity than said image carrier on said image carrier in accordance with an image signal;

means for supplying charges onto said image carrier so as to charge the developing agent holding layer to form developing agent holding regions on the developing agent holding layer, thereby forming an electrostatic latent image in the developing agent holding regions;

means for supplying a developing agent charged opposite to the electrostatic latent image to the image carrier so as to form an ink image in the developing agent holding regions; and a press member for pressing said image carrier with a printing medium interposed therebetween so as to transfer the developing agent onto said printing medium, current being allowed to flow in the pressed region between said first and second electrodes to generate Joule heat which permits the developing agent to be fixed on the printing medium.

19. An apparatus according to claim 18, wherein said image carrier includes a first electrode layer, a pressure switching layer formed on the first electrode layer, a heating resistive layer formed on the switching layer, and a second electrode layer formed on the heating resistive layer, and said transfer means is constituted by a press member, said transfer means causing the press member to be partially brought into contact with said image carrier through a printing medium, and applying a voltage between the first and second electrodes to cause a current to flow in a pressed region of the switching layer so as to generate Joule heat, thereby fixing a non-fixed developing agent on the printing medium by using the Joule heat.

20. An apparatus according to claim 18, wherein the pressure switching layer is composed of a pressure sensitive conductive resin.

* * * * *